United States Patent [19]

Ogawa

[11] Patent Number: 5,731,642
[45] Date of Patent: Mar. 24, 1998

[54] MAGNETIC CIRCUIT STRUCTURE IN ROTARY ACTUATOR

[75] Inventor: Yoshinori Ogawa, Kawasaki, Japan

[73] Assignee: Fujitsu Limited, Kawasaki, Japan

[21] Appl. No.: 582,331

[22] Filed: Jan. 5, 1996

[30] Foreign Application Priority Data

Apr. 28, 1995 [JP] Japan ................... 7-105350

[51] Int. Cl.$^6$ .................. H02K 41/00; G11B 5/54
[52] U.S. Cl. ................................. 310/13; 360/105
[58] Field of Search ........................... 310/12, 13, 15, 310/19; 335/279, 280, 281; 369/215, 219, 225, 249; 360/105, 106, 107, 109

[56] References Cited

U.S. PATENT DOCUMENTS

| | | | |
|---|---|---|---|
| 4,456,934 | 6/1984 | Wedman et al. | 310/12 |
| 4,602,232 | 7/1986 | Umehara et al. | 335/223 |
| 4,652,779 | 3/1987 | Wilcox | 310/13 |
| 4,965,685 | 10/1990 | Thompson et al. | 360/105 |
| 5,113,099 | 5/1992 | Wong et al. | 310/13 |
| 5,179,304 | 1/1993 | Kenjo et al. | 310/12 |
| 5,424,591 | 6/1995 | Kuriyama | 310/12 |

FOREIGN PATENT DOCUMENTS

| | | |
|---|---|---|
| 61-203859 | 9/1986 | Japan. |
| 62-135253 | 6/1987 | Japan. |
| 63-87163 | 4/1988 | Japan. |
| 63-89047 | 4/1988 | Japan. |
| 63-148854 | 6/1988 | Japan. |
| 63-194559 | 8/1988 | Japan. |
| 6335220 | 12/1994 | Japan. |

*Primary Examiner*—Clayton E. Laballe
*Attorney, Agent, or Firm*—Greer, Burns & Crain, Ltd.

[57] ABSTRACT

A magnetic circuit structure in a rotary actuator which can reduce the inductance of a coil while negligibly reducing a magnetic flux density between gaps. The magnetic circuit structure includes an E-shaped main yoke formed by integrally connecting a curved inner yoke, a curved center yoke, and a curved outer yoke. The E-shaped main yoke is manufactured by stacking a plurality of rolled steel plates. An inner magnet is mounted on the outer circumferential surface of the inner yoke opposed to the center yoke, and an outer magnet is mounted on the inner circumferential surface of the outer yoke opposed to the center yoke. A side yoke is magnetically attached to the open end of the E-shaped main yoke. A through hole extending in parallel to the axis of rotation of the rotary actuator is formed at a circumferential central portion of the center yoke.

16 Claims, 24 Drawing Sheets

MAGNETIC CIRCUIT STRUCTURE IN ROTARY ACTUATOR

BACKGROUND OF THE INVENTION

1. Field of the Invention

The present invention relates to a magnetic circuit structure in a rotary actuator for a disk drive.

2. Description of the Related Art

In recent years, a reduction in size and an increase in storage capacity have been desired in a magnetic disk drive as a kind of external storage for a computer. The reduction in size of the magnetic disk drive necessitates a compact, high-performance actuator to be mounted in the magnetic disk drive. The actuator is usually driven by a voice coil motor (VCM) constituted of a magnetic circuit and a coil. To realize high-speed access of the actuator in the magnetic disk drive, the actuator must have a sufficient acceleration.

That is, it is important to ensure a high acceleration of a head mounted on the actuator in response to energy input to the voice coil motor. As one means to ensure the high acceleration, there is known a voice coil motor employing a coil having effective portions parallel to the axis of rotation of the actuator and an E-shaped main yoke as a magnetic circuit. The E-shaped main yoke is formed by integrally connecting a curved inner yoke, a curved center yoke, and a curved outer yoke at their ends on the same side. A curved inner magnet and a curved outer magnet are mounted on the inner yoke and the outer yoke, respectively.

This voice coil motor structure has merits such that the acceleration of the head mounted on the actuator in response to input energy can be made large and the voice coil motor can be made relatively compact. This voice coil motor structure has further merits such that the rigidity of the coil is high and in vibration characteristics. However, this voice coil motor structure has the following disadvantage. That is, the yoke of the magnetic circuit is disposed in the VCM coil. As a result, the inductance of the VCM coil becomes large, causing slow rising of an electric current passing through the VCM coil to result in a reduction in acceleration performance.

SUMMARY OF THE INVENTION

It is therefore an object of the present invention to provide a magnetic circuit structure in a rotary actuator which can reduce the inductance of a VCM coil.

In accordance with an aspect of the present invention, there is provided a magnetic circuit structure in a rotary actuator having an axis of rotation, comprising a main yoke manufactured by stacking a plurality of rolled steel plates, the main yoke comprising a curved inner yoke, a curved center yoke spaced a given distance from the inner yoke, a curved outer yoke spaced a given distance from the center yoke, and a connecting portion integrally connecting the inner yoke, the center yoke, and the outer yoke; an inner magnet mounted on an outer circumferential surface of the inner yoke opposed to the center yoke; an outer magnet mounted on an inner circumferential surface of the outer yoke opposed to the center yoke; and a side yoke attached to the main yoke on its one side opposite to the connecting portion by magnetic forces of the inner magnet and the outer magnet; the center yoke having a through hole at a substantially central portion in a circumferential direction of the center yoke.

Preferably, the through hole formed in the center yoke extends substantially in parallel to the axis of rotation of the rotary actuator. More preferably, similar through holes are formed also in the inner yoke and the outer yoke. The through hole of the center yoke may be replaced by a gap with a given width defined by separating the center yoke at its circumferential central portion into a first center yoke segment and a second center yoke segment and spacing the first center yoke segment and the second center yoke segment from each other.

In accordance with another aspect of the present invention, there is provided a magnetic circuit structure in a rotary actuator having an axis of rotation, comprising a main yoke comprising a curved inner yoke, a curved first center yoke segment spaced a given distance from the inner yoke, a curved outer yoke spaced a given distance from the first center yoke segment, and a connecting portion integrally connecting the inner yoke, the first center yoke segment, and the outer yoke; a curved second center yoke segment; an upper magnetic plate fixed by caulking to an upper surface of the main yoke and an upper surface of the second center yoke segment so that the first center yoke segment and the second center yoke segment are aligned in their circumferential directions with a gap having a given width being defined therebetween; a lower magnetic plate fixed by caulking to a lower surface of the main yoke and a lower surface of the second center yoke segment; an inner magnet mounted on an outer circumferential surface of the inner yoke opposed to the first and second center yoke segments; an outer magnet mounted on an inner circumferential surface of the outer yoke opposed to the first and second center yoke segments; and a side yoke attached to the main yoke and the second center yoke segment on their one side opposite to the connecting portion by magnetic forces of the inner magnet and the outer magnet.

According to the present invention, the through hole extending substantially in parallel to the axis of rotation of the rotary actuator is formed near the circumferential center of at least the center yoke of the main yoke. With this structure, the inductance of the VCM coil can be reduced while hardly reducing the magnetic flux density between an inner gap and an outer gap. Accordingly, the rising characteristic of an electric current passing through the VCM coil can be improved to thereby improve the acceleration performance of the actuator.

The above and other objects, features and advantages of the present invention and the manner of realizing them will become more apparent, and the invention itself will best be understood from a study of the following description and appended claims with reference to the attached drawings showing some preferred embodiments of the invention.

3

Figure 7A:
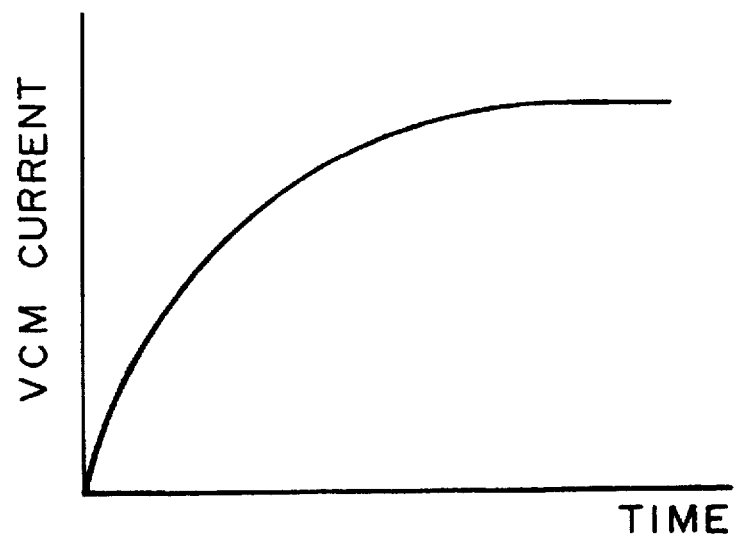
FIG. 7A is a graph showing the rising characteristic of an electric current passing through a VCM coil in a conventional magnetic circuit.
Figure 7B:
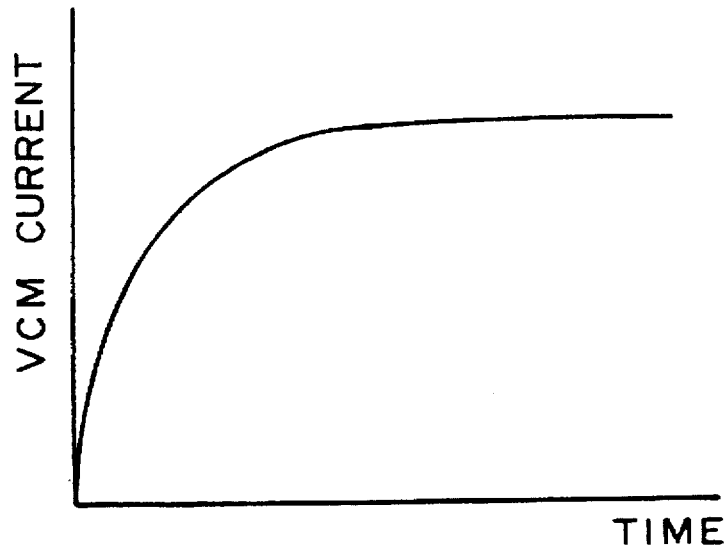
Figure 8:
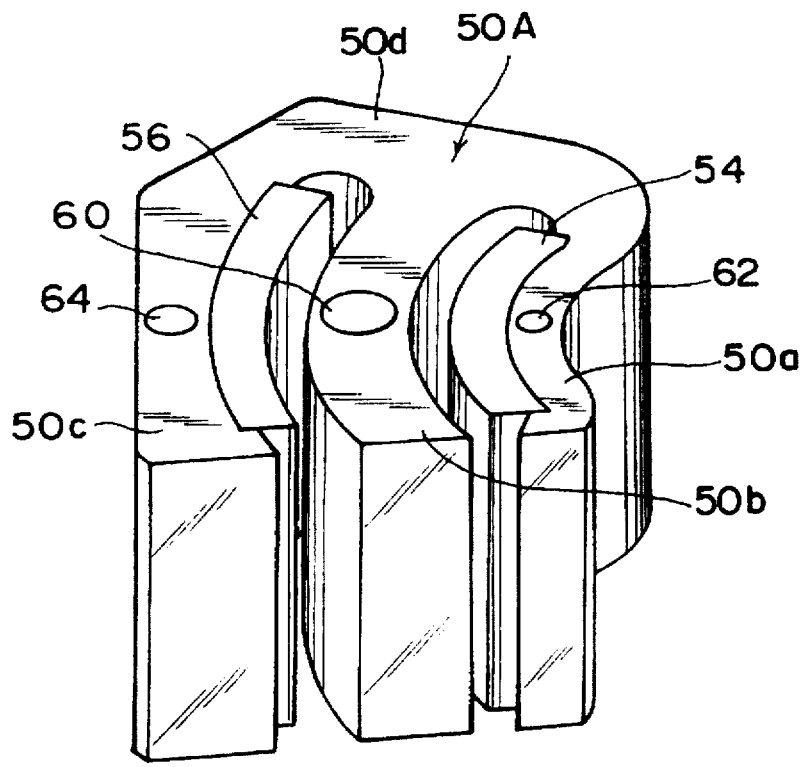
Figure 8:
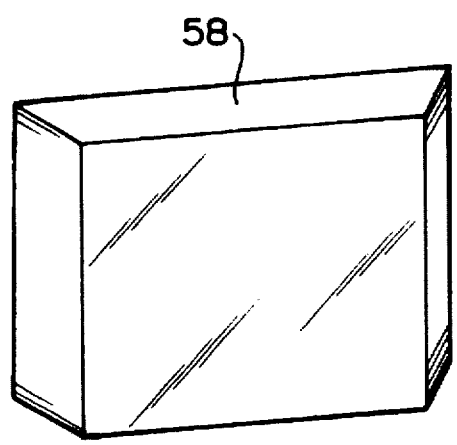
Figure 9:
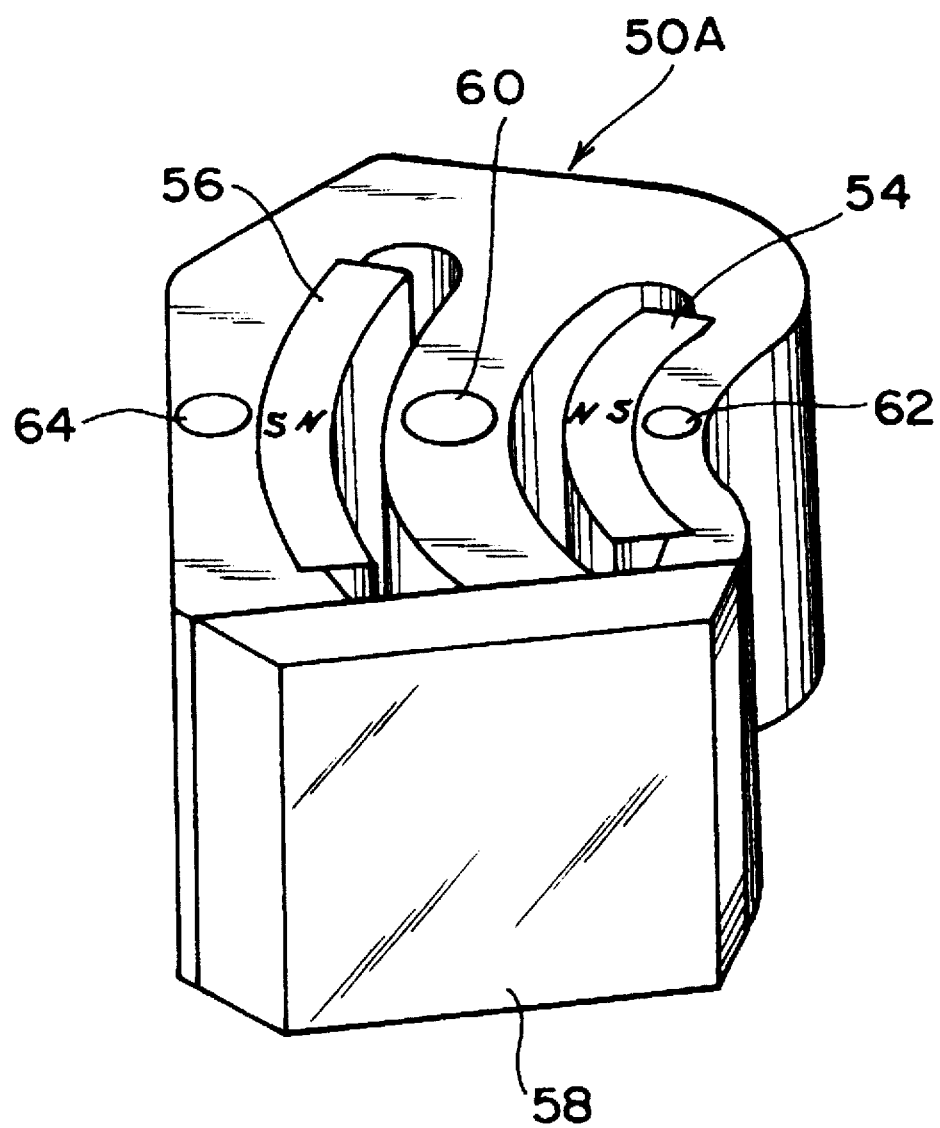
Figure 10:
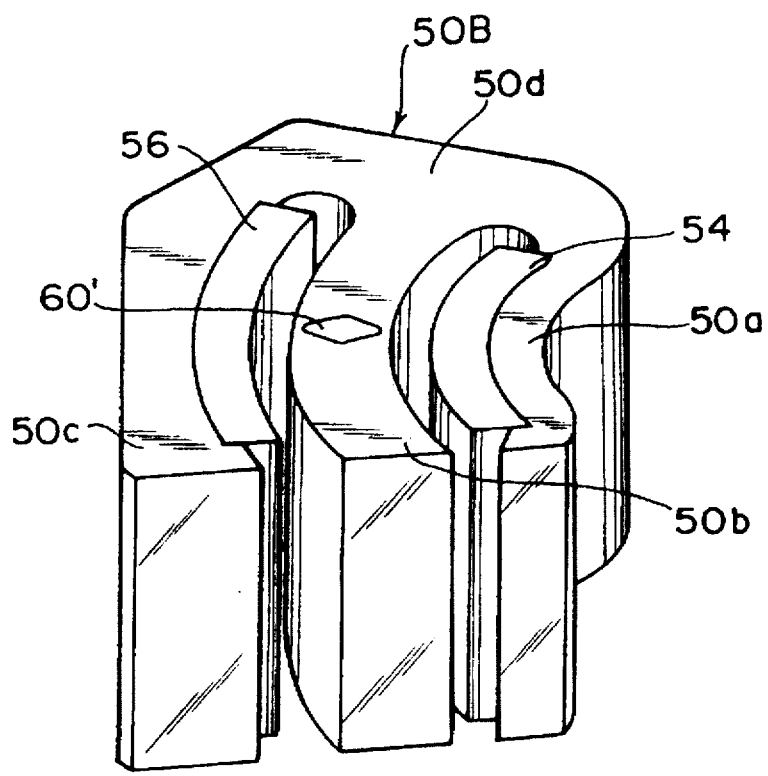
Figure 10:
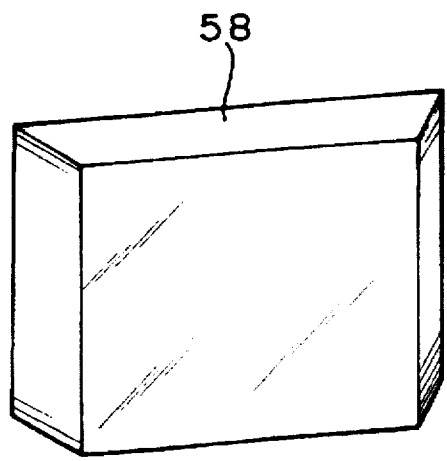
Figure 11:
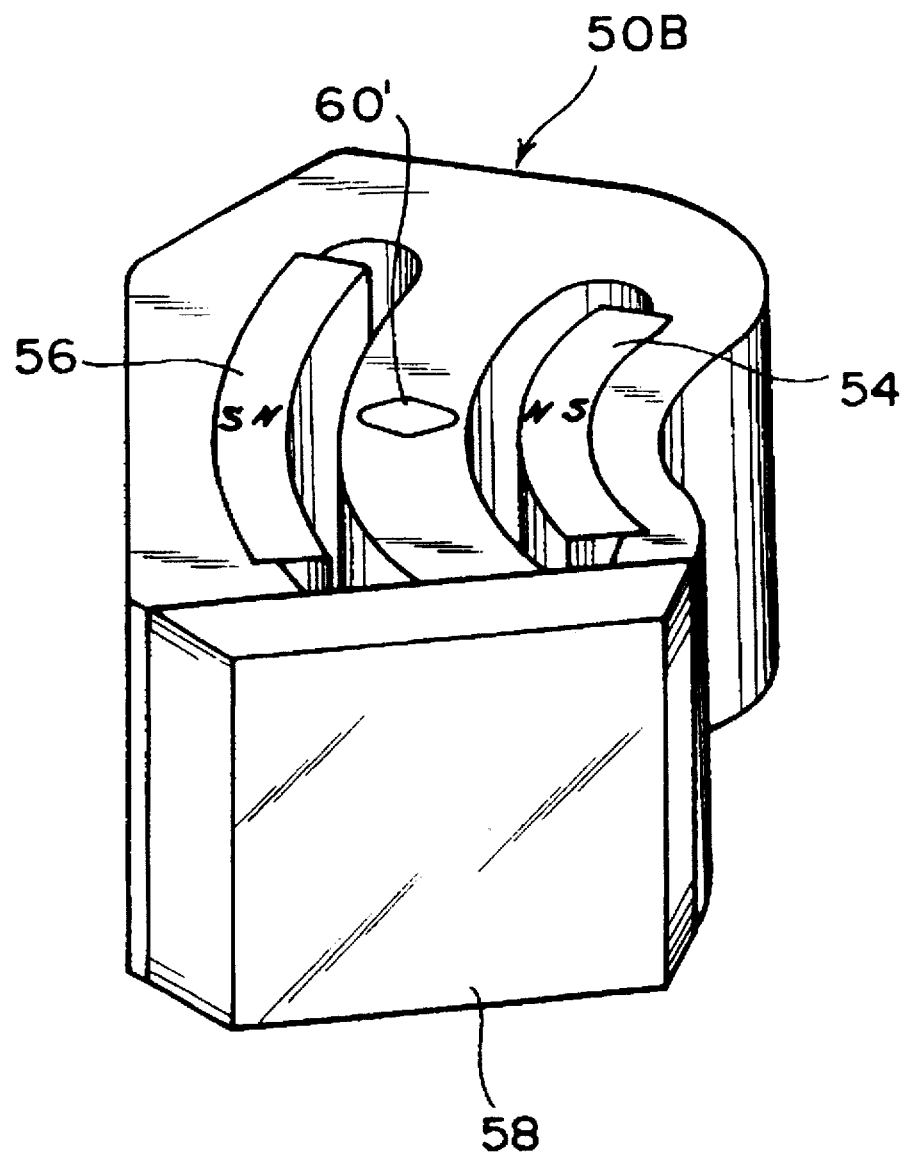
Figure 12:
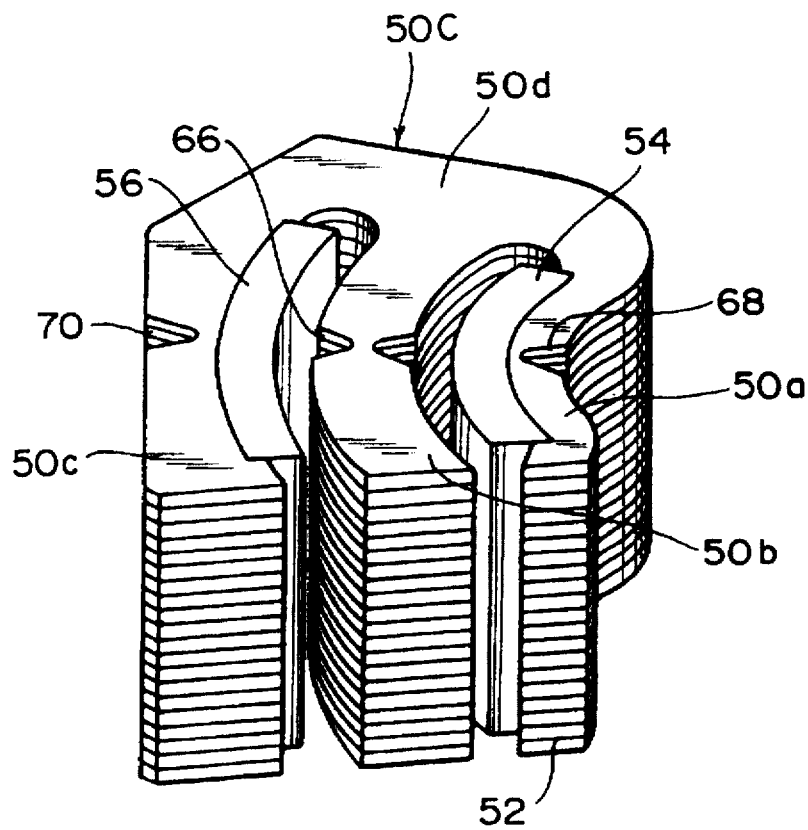
Figure 12:
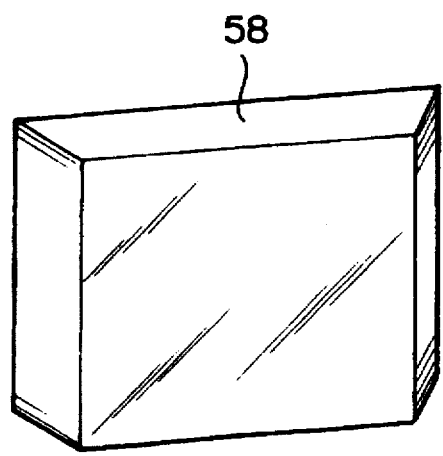
Figure 13:
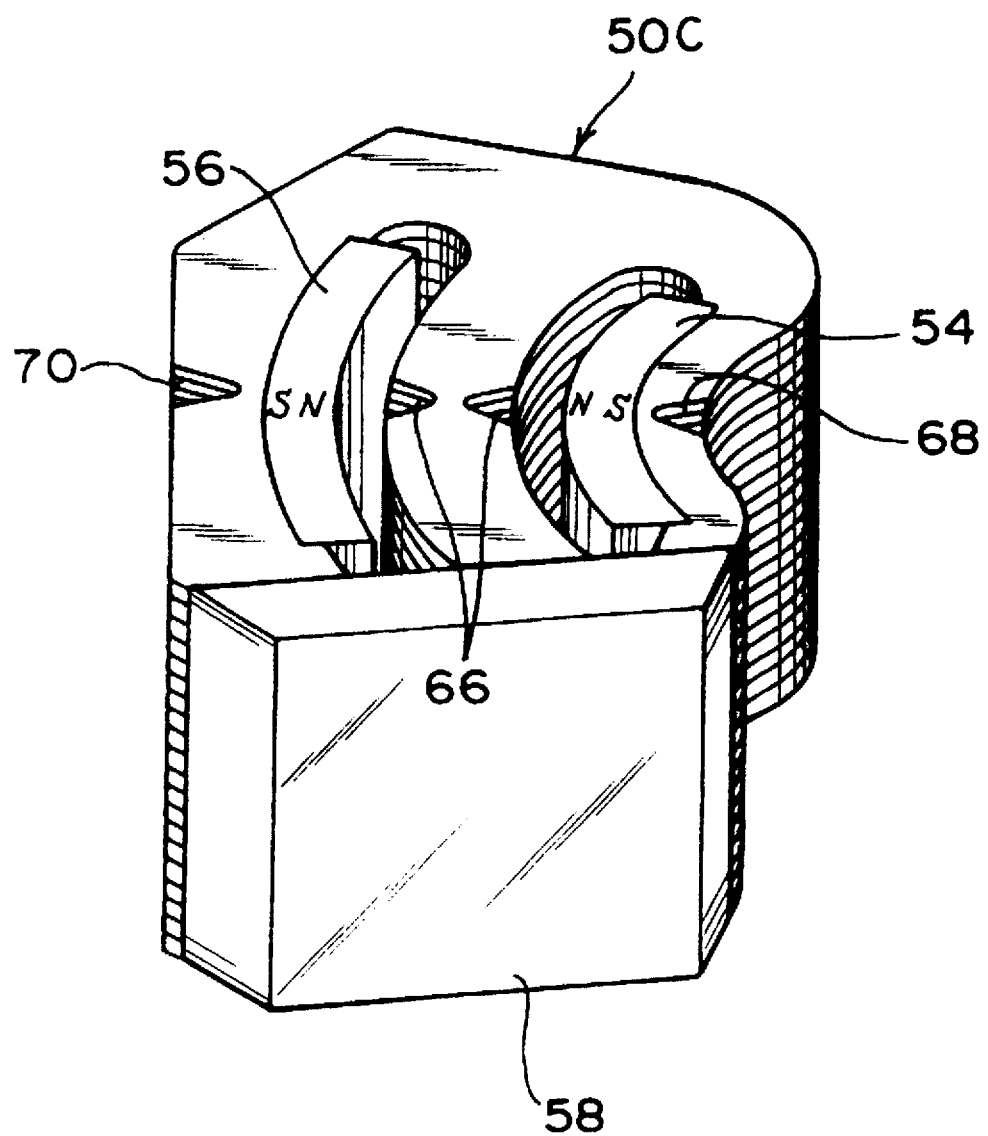
Figure 14:
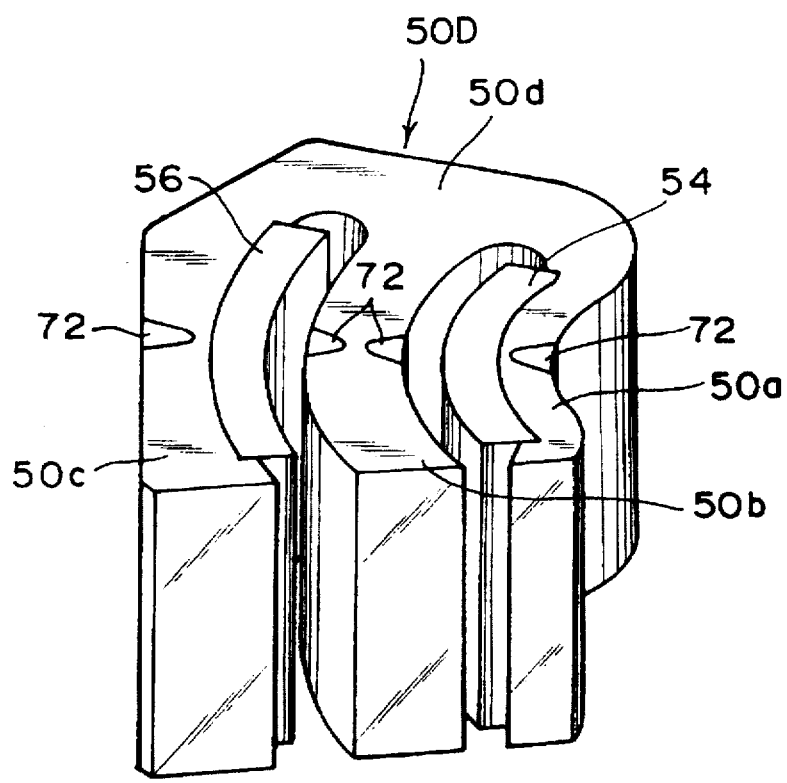
Figure 14:
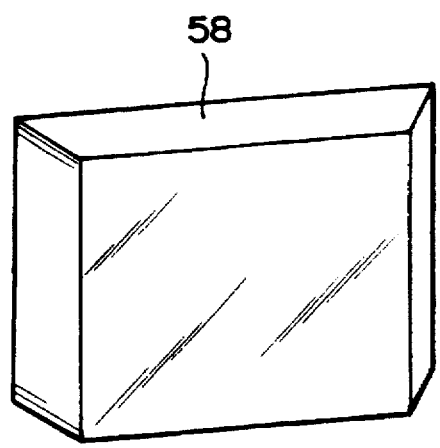
Figure 15:
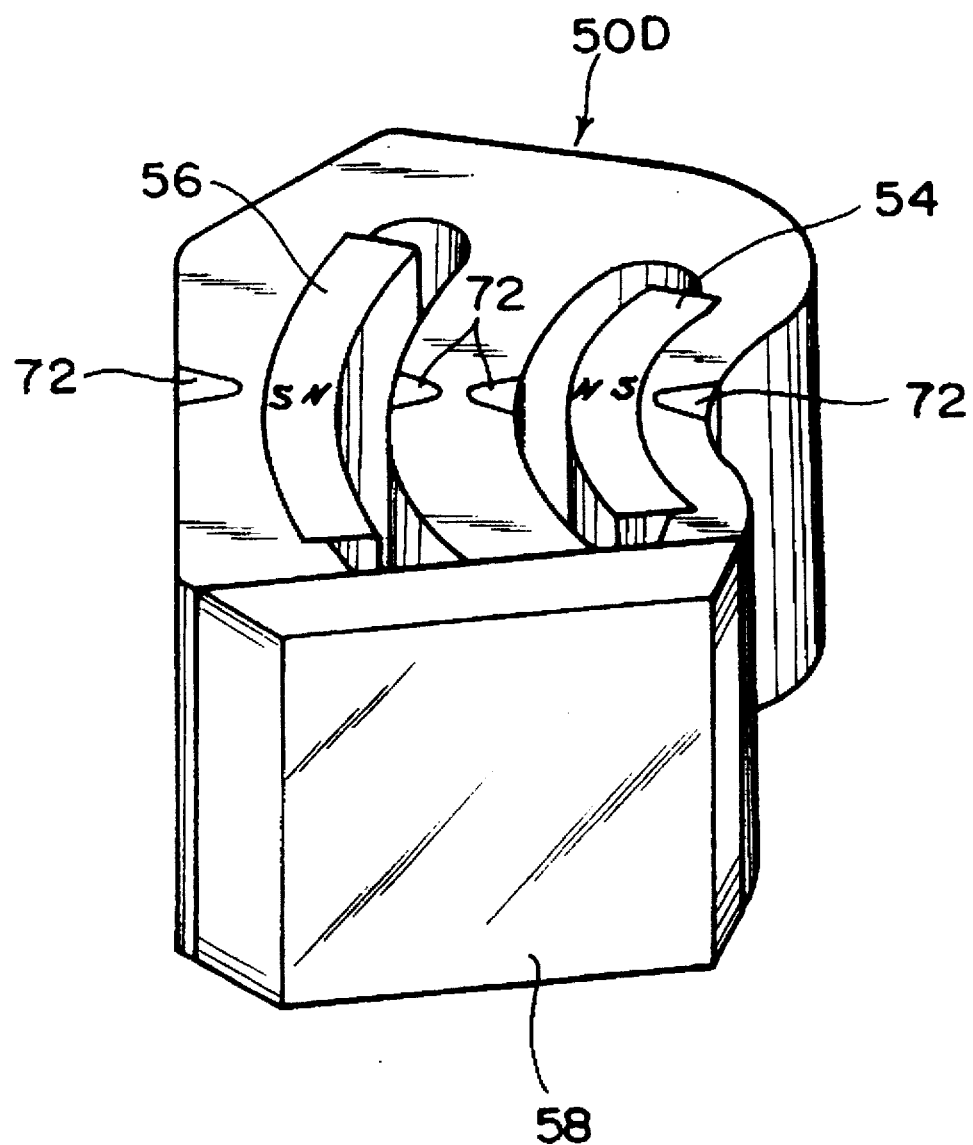
Figure 16:
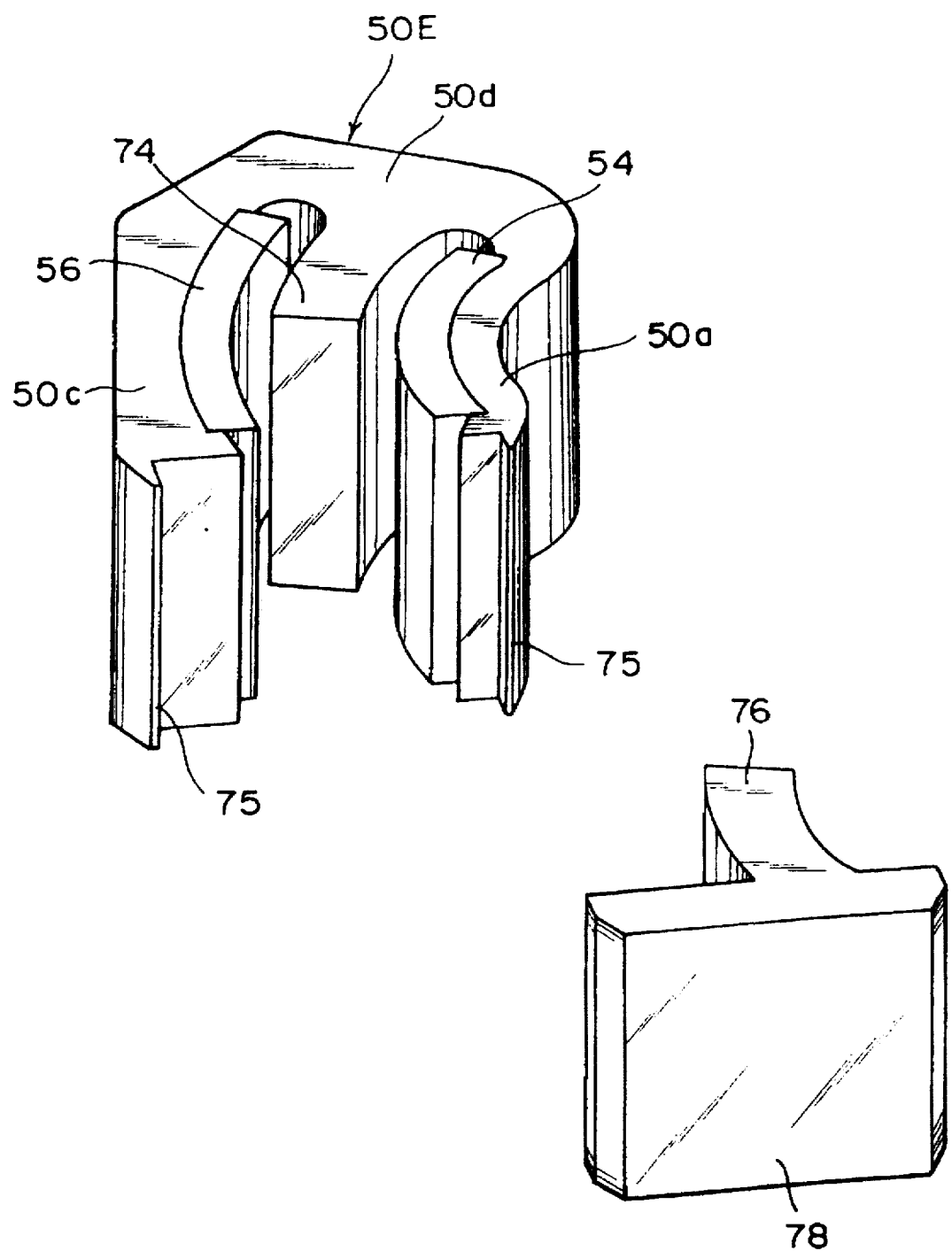
Figure 17:
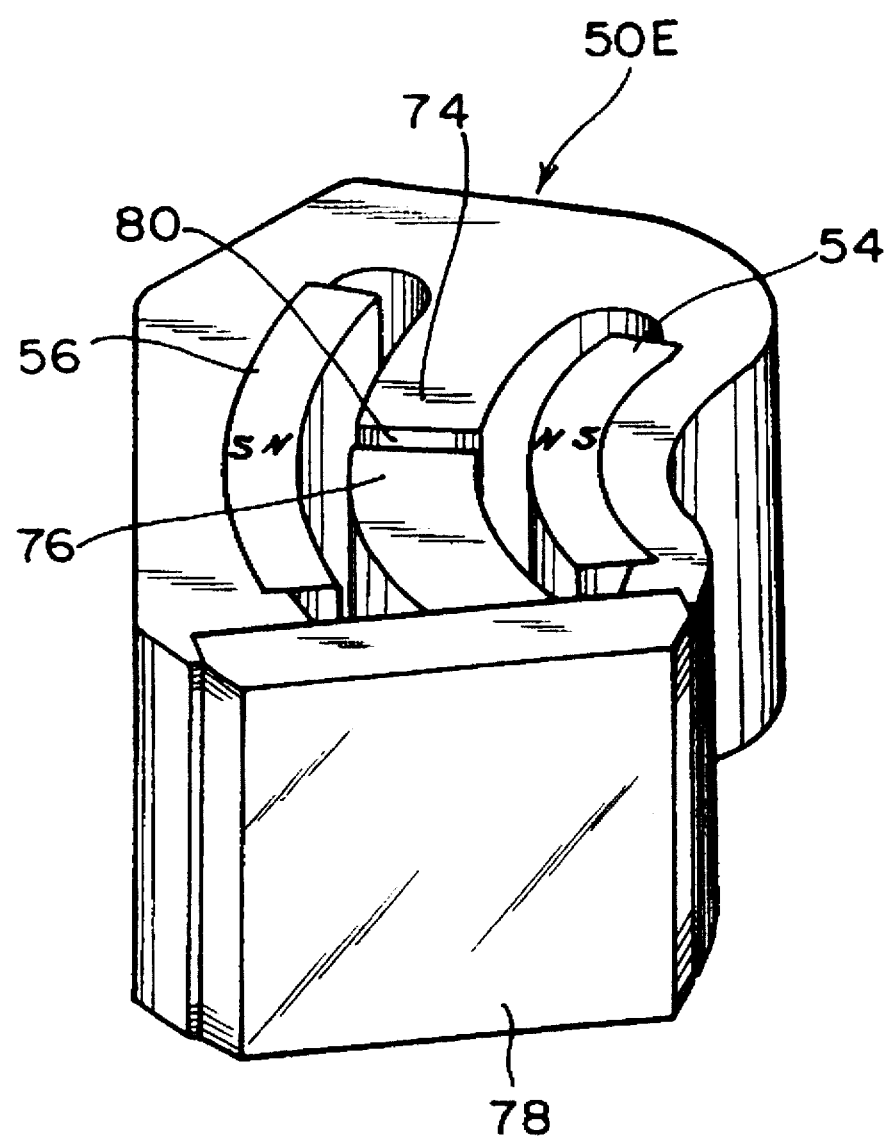
Figure 18:
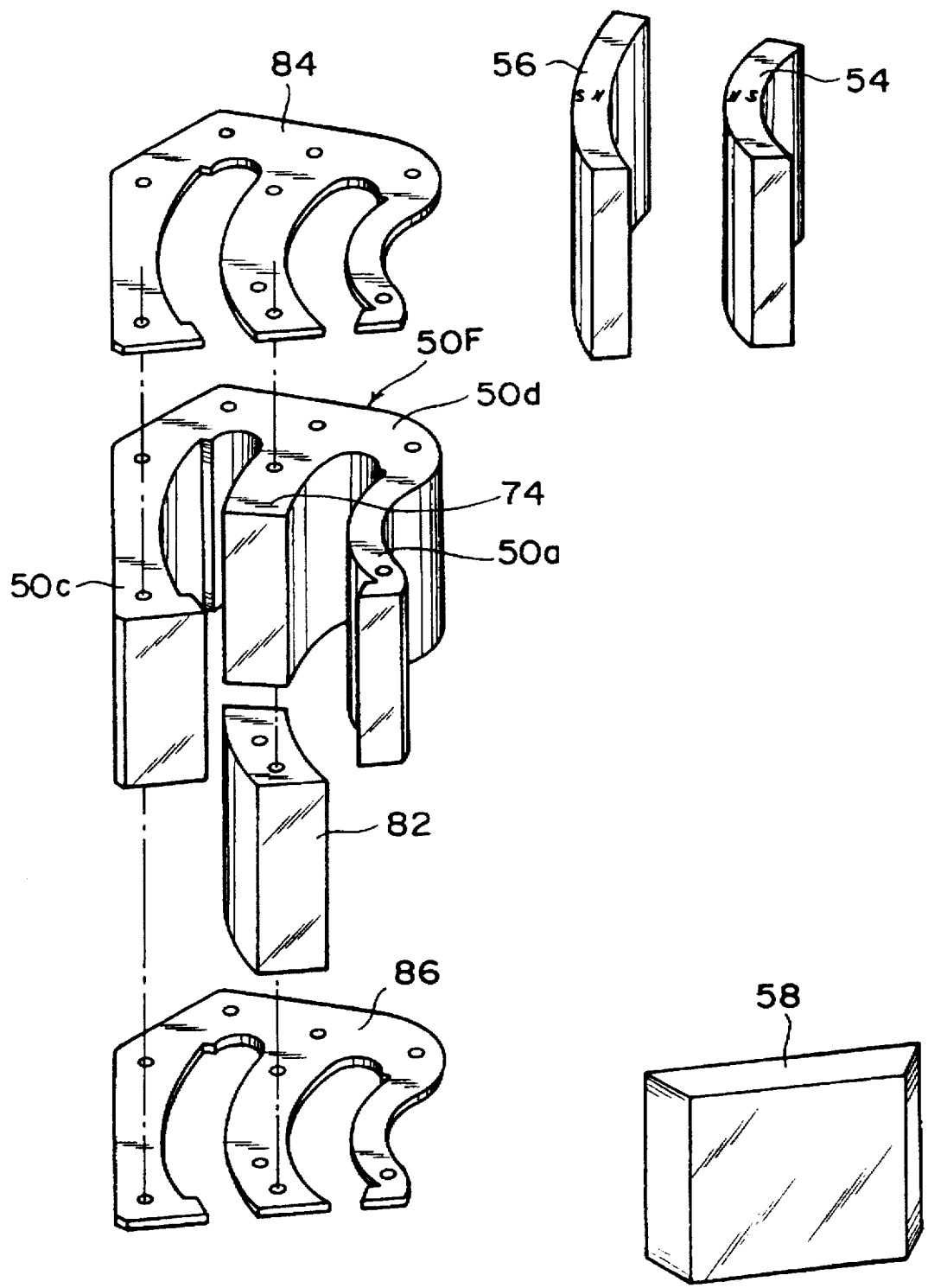
Figure 19:
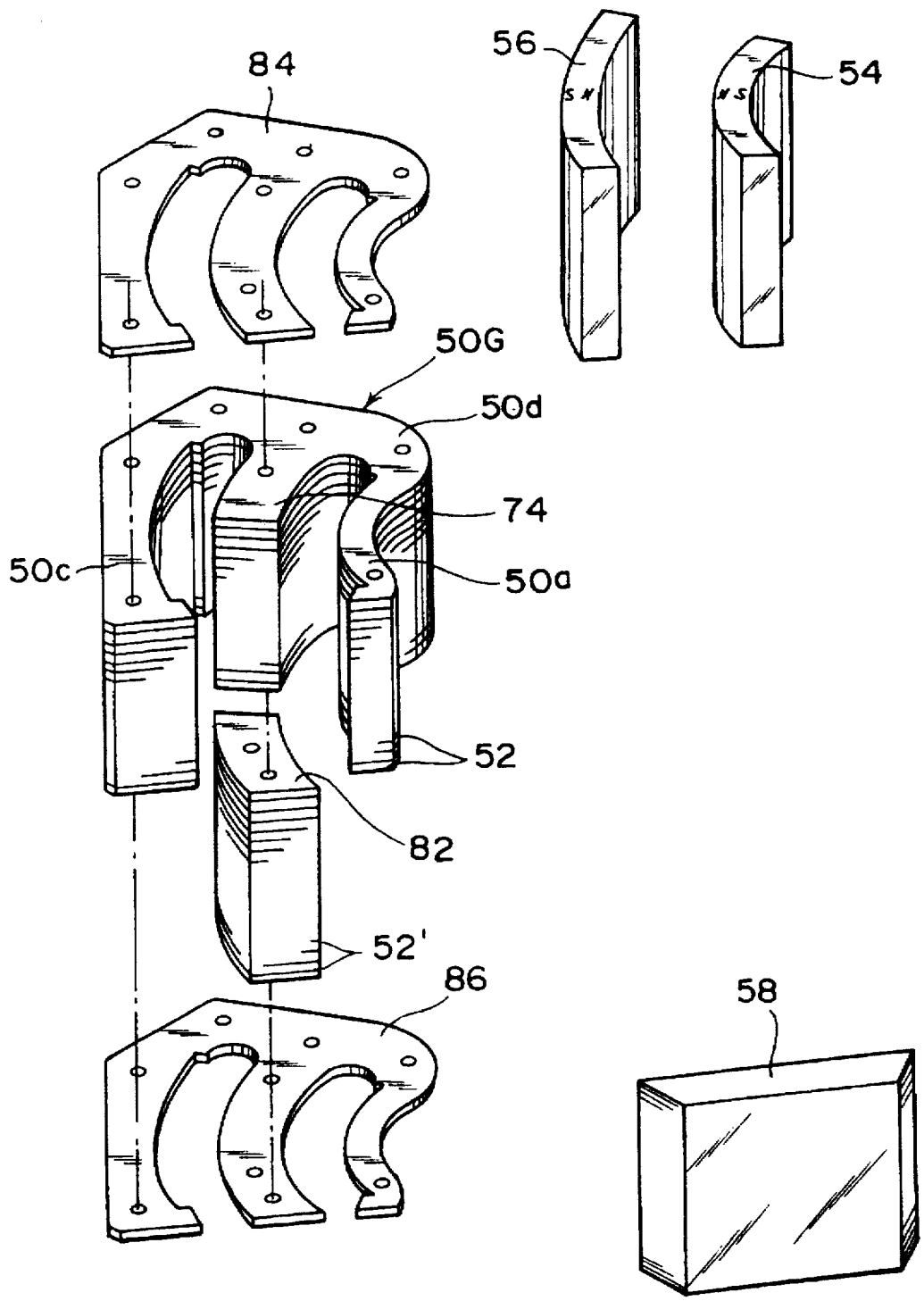
Figure 20:
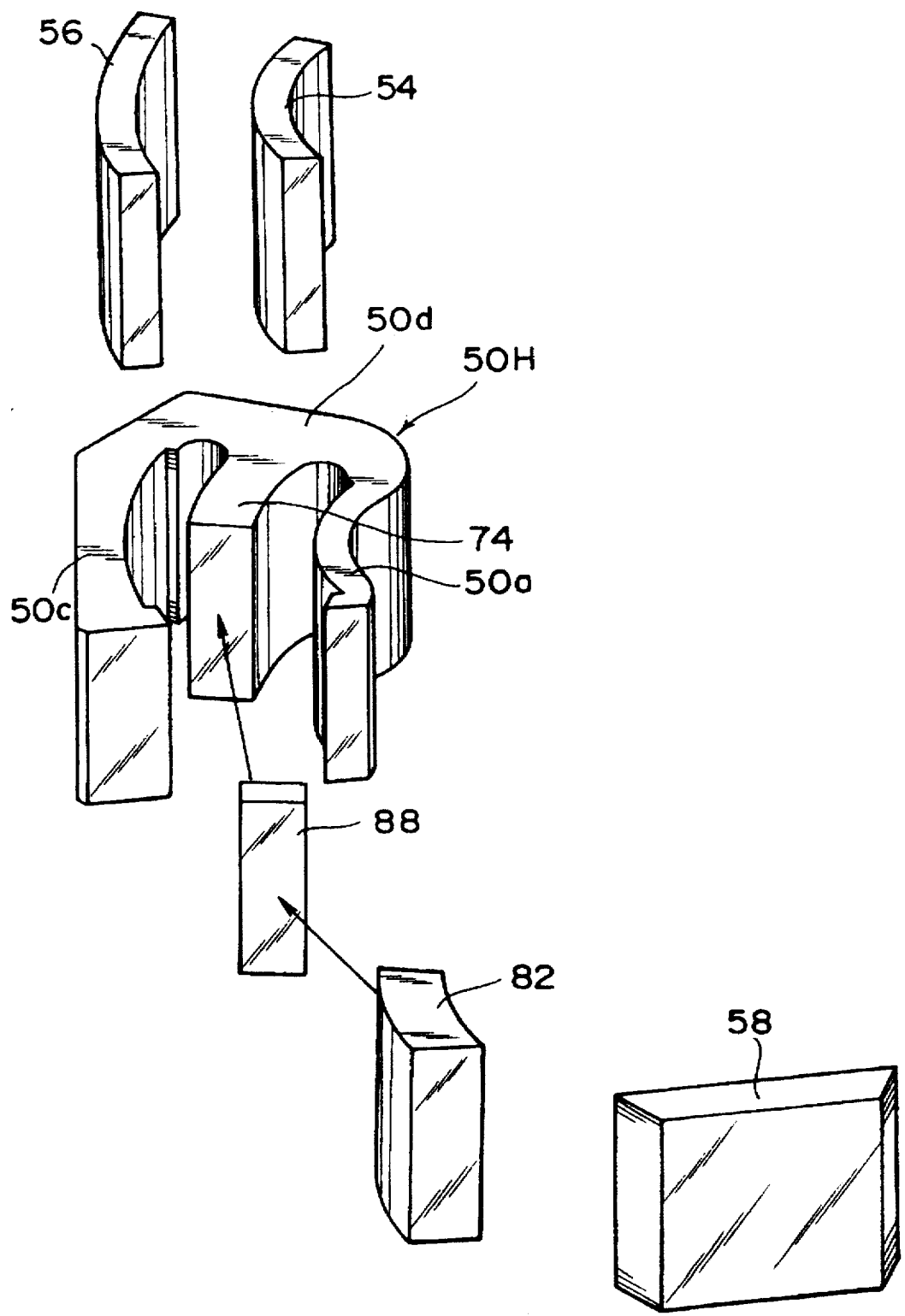
Figure 21:
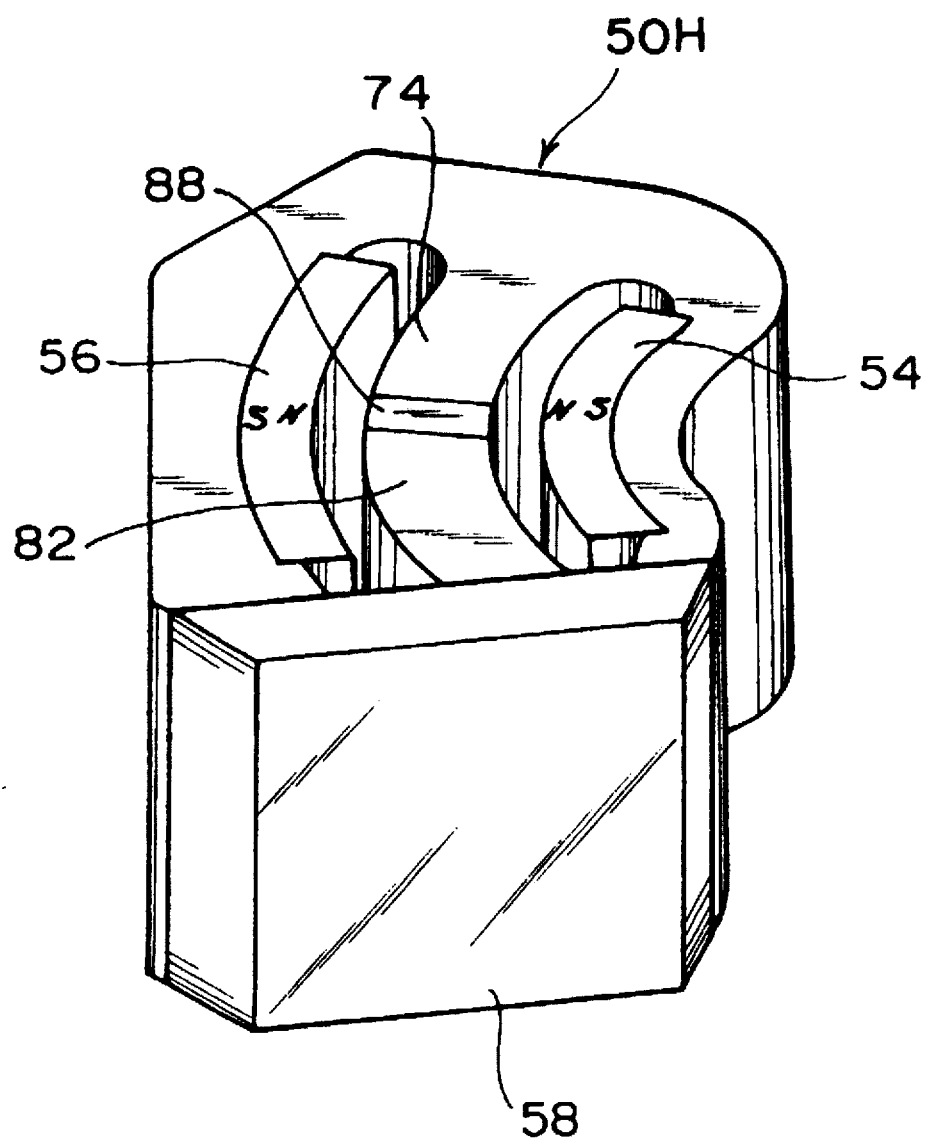
Figure 22:
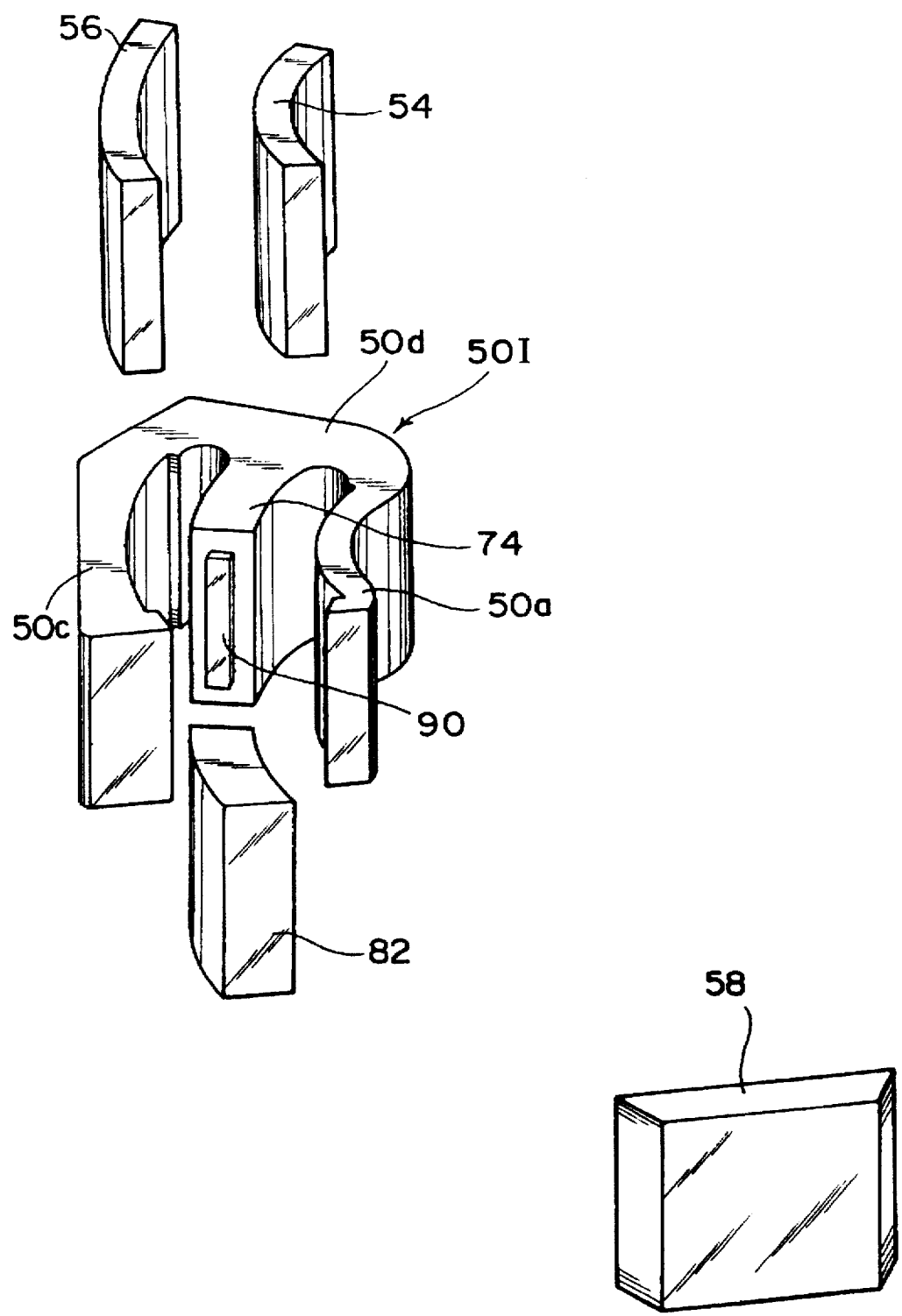
Figure 23:
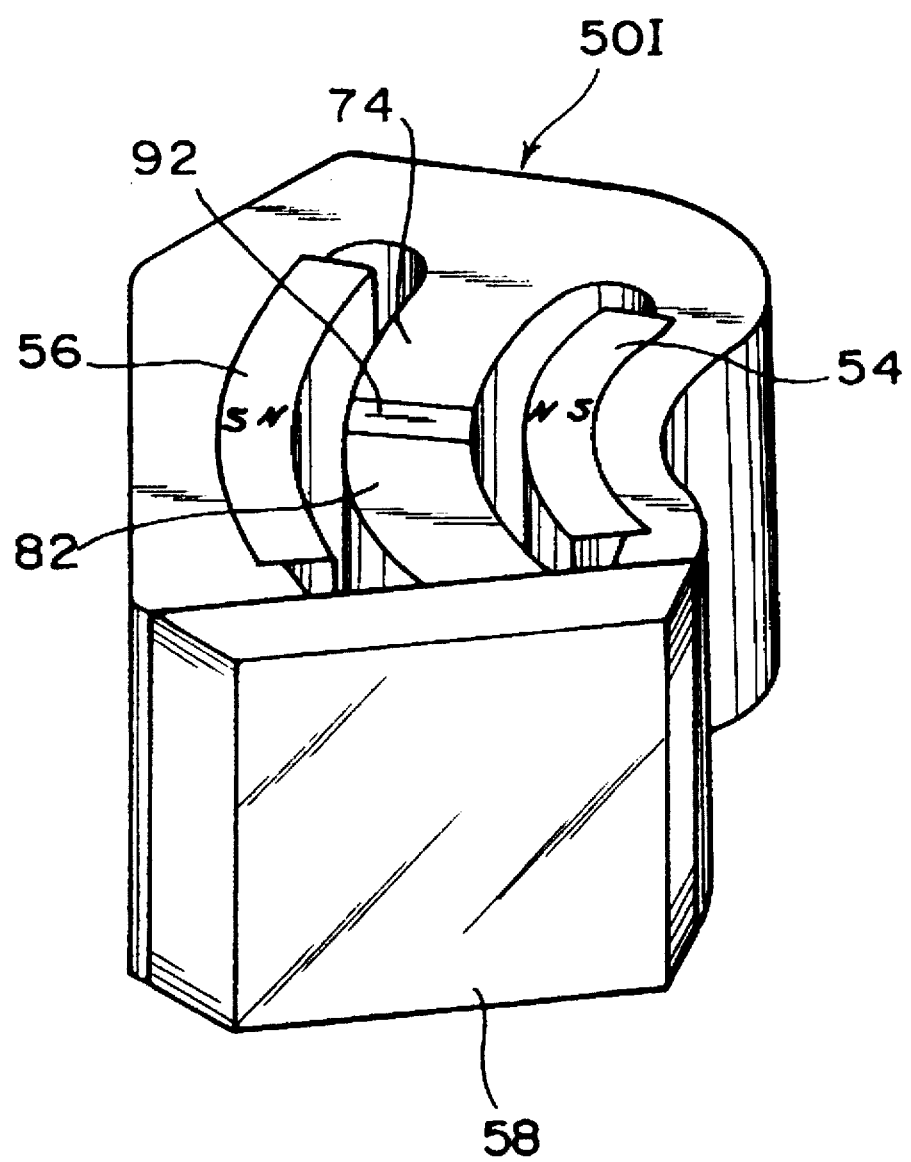
Figure 24:
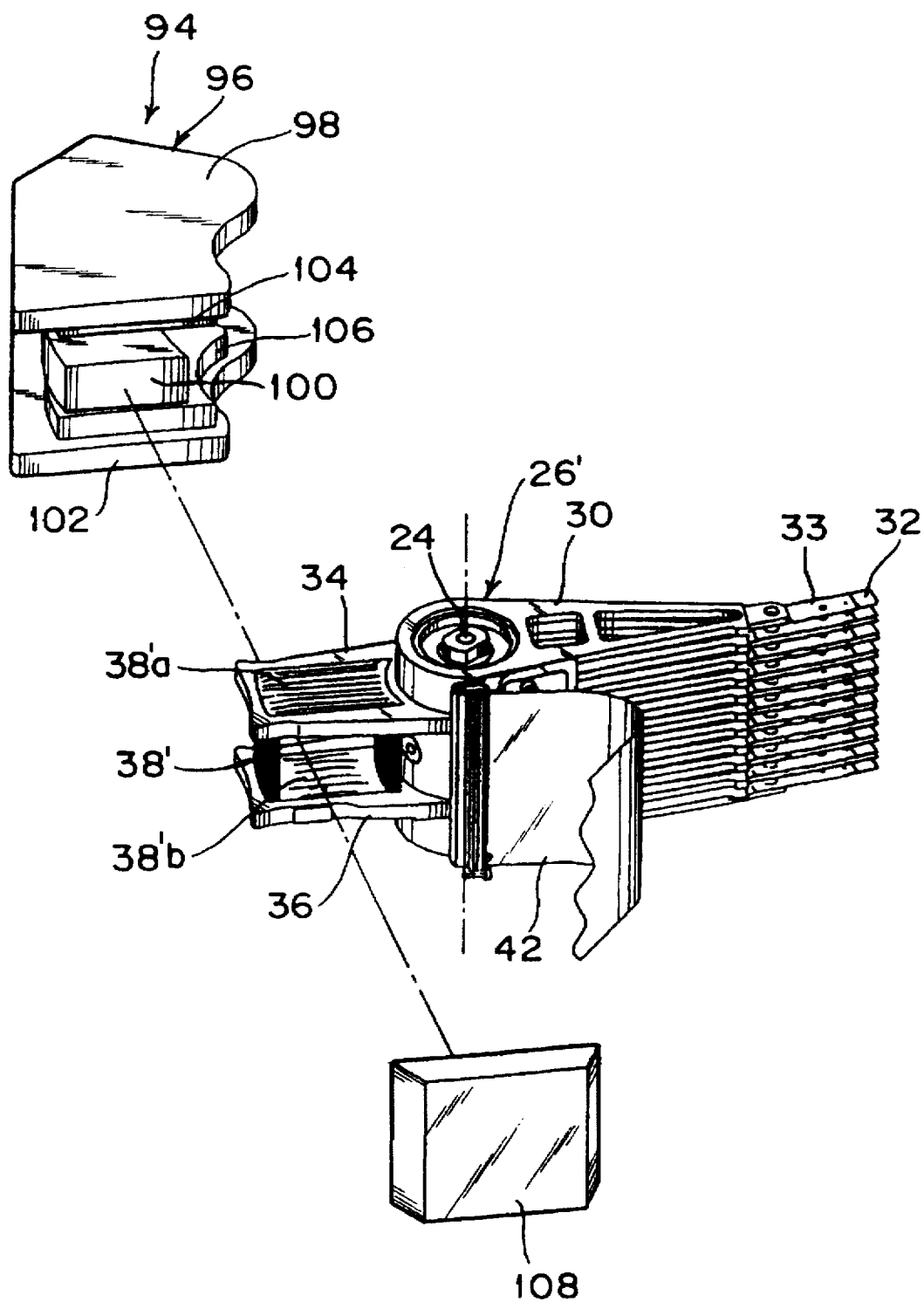
Figure 25:
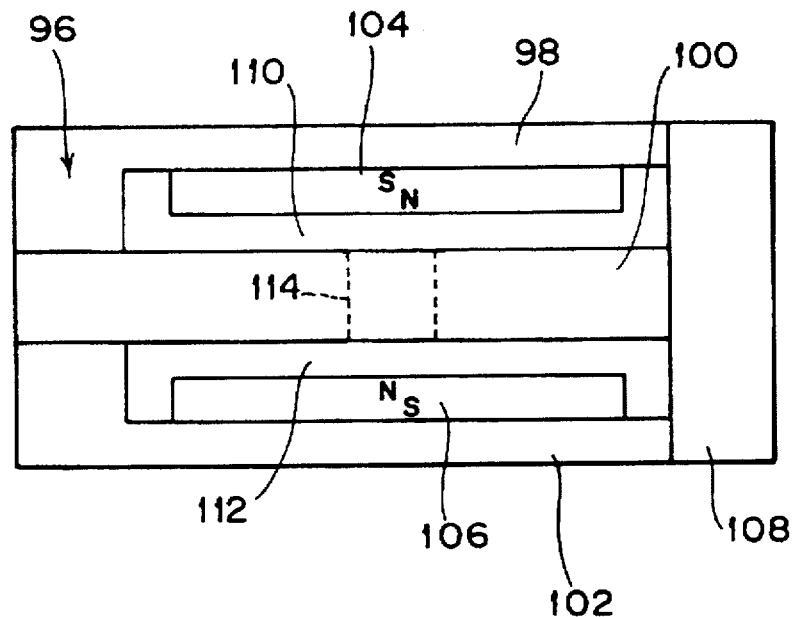
Figure 26:
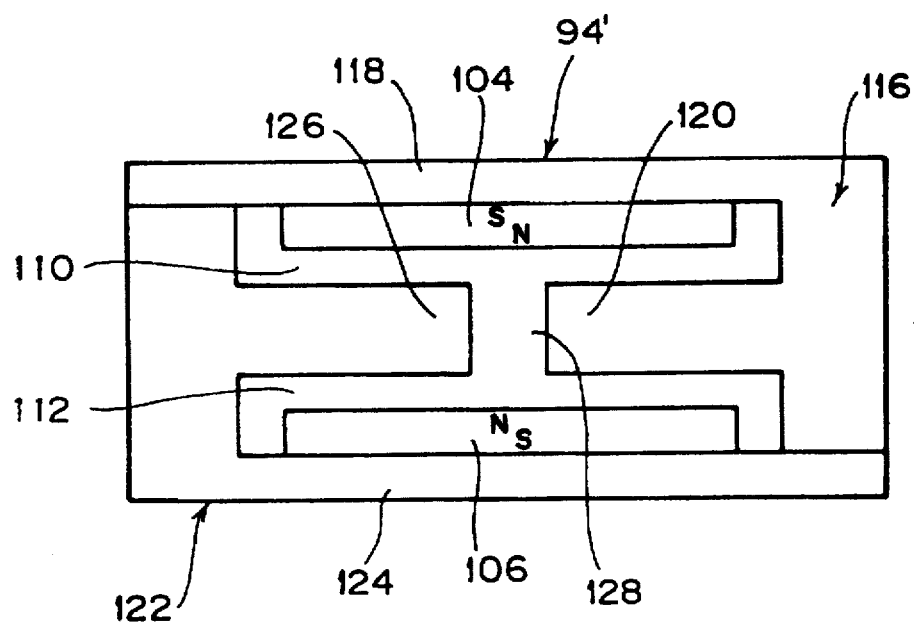

FIG. 7B is a graph showing the rising characteristic of an electric current passing through the VCM coil in the first preferred embodiment;

FIG. 8 is an exploded perspective view of a second preferred embodiment of the present invention;

FIG. 9 is a perspective view of the second preferred embodiment;

FIG. 10 is an exploded perspective view of a third preferred embodiment of the present invention;

FIG. 11 as a perspective view of the third preferred embodiment;

FIG. 12 is an exploded perspective view of a fourth preferred embodiment of the present invention;

FIG. 13 is a perspective view of the fourth preferred embodiment;

FIG. 14 is an exploded perspective view of a fifth preferred embodiment of the present invention;

FIG. 15 is a perspective view of the fifth preferred embodiment;

FIG. 16 is an exploded perspective view of a sixth preferred embodiment of the present invention;

FIG. 17 is a perspective view of the sixth preferred embodiment;

FIG. 18 is an exploded perspective view of a seventh preferred embodiment of the present invention;

FIG. 19 is an exploded perspective view of an eighth preferred embodiment of the present invention;

FIG. 20 is an exploded perspective view of a ninth preferred embodiment of the present invention;

FIG. 21 is a perspective view of the ninth preferred embodiment;

FIG. 22 as an exploded perspective view of a tenth preferred embodiment of the present invention;

FIG. 23 is a perspective view of the tenth preferred embodiment;

FIG. 24 is an exploded perspective view of another embodiment of the rotary actuator;

FIG. 25 is a front elevation of an eleventh preferred embodiment of the present invention; and FIG. 26 is a front elevation of a twelfth preferred embodiment of the present invention.

DETAILED DESCRIPTION OF THE PREFERRED EMBODIMENTS

Figure 1:
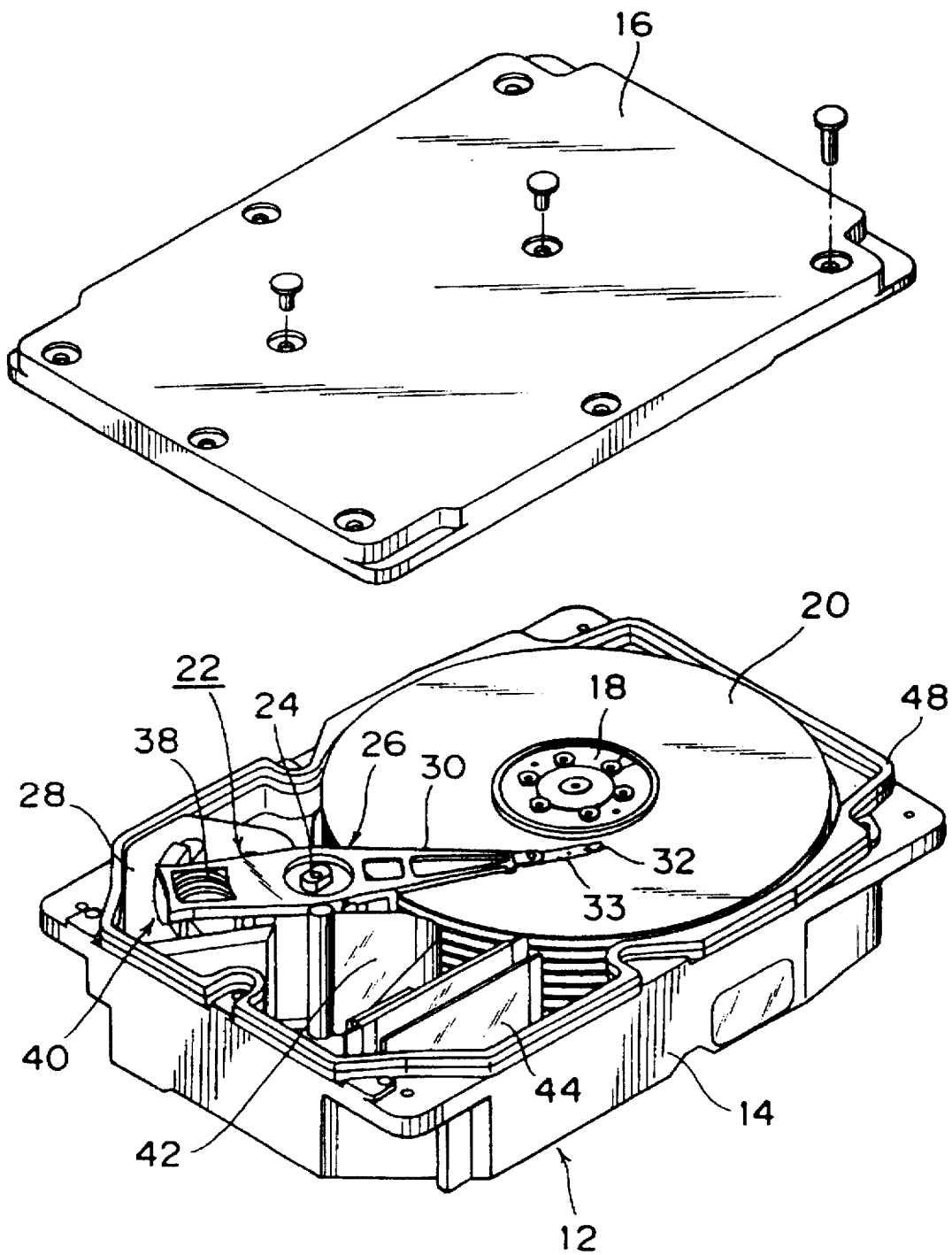
FIG. 1 is a perspective view of a magnetic disk drive including a magnetic circuit of the present invention.

Referring to FIG. 1, there is shown a perspective view of a magnetic disk drive having a magnetic circuit according to the present invention. Reference numeral 12 denotes a housing (disk enclosure) composed of a base 14 and a cover 16. A spindle hub (not shown) to be rotatably driven by an inner hub motor (not shown) is provided on the base 14. A plurality of magnetic disks 20 and spacers (not shown) are alternately stacked and mounted on the spindle hub. That is, the plurality of magnetic disks 20 are regularly spaced from each other by the spacers and are fixedly mounted on the spindle hub by securing a disk clamp 18 to the spindle hub by screws.

Figure 2:
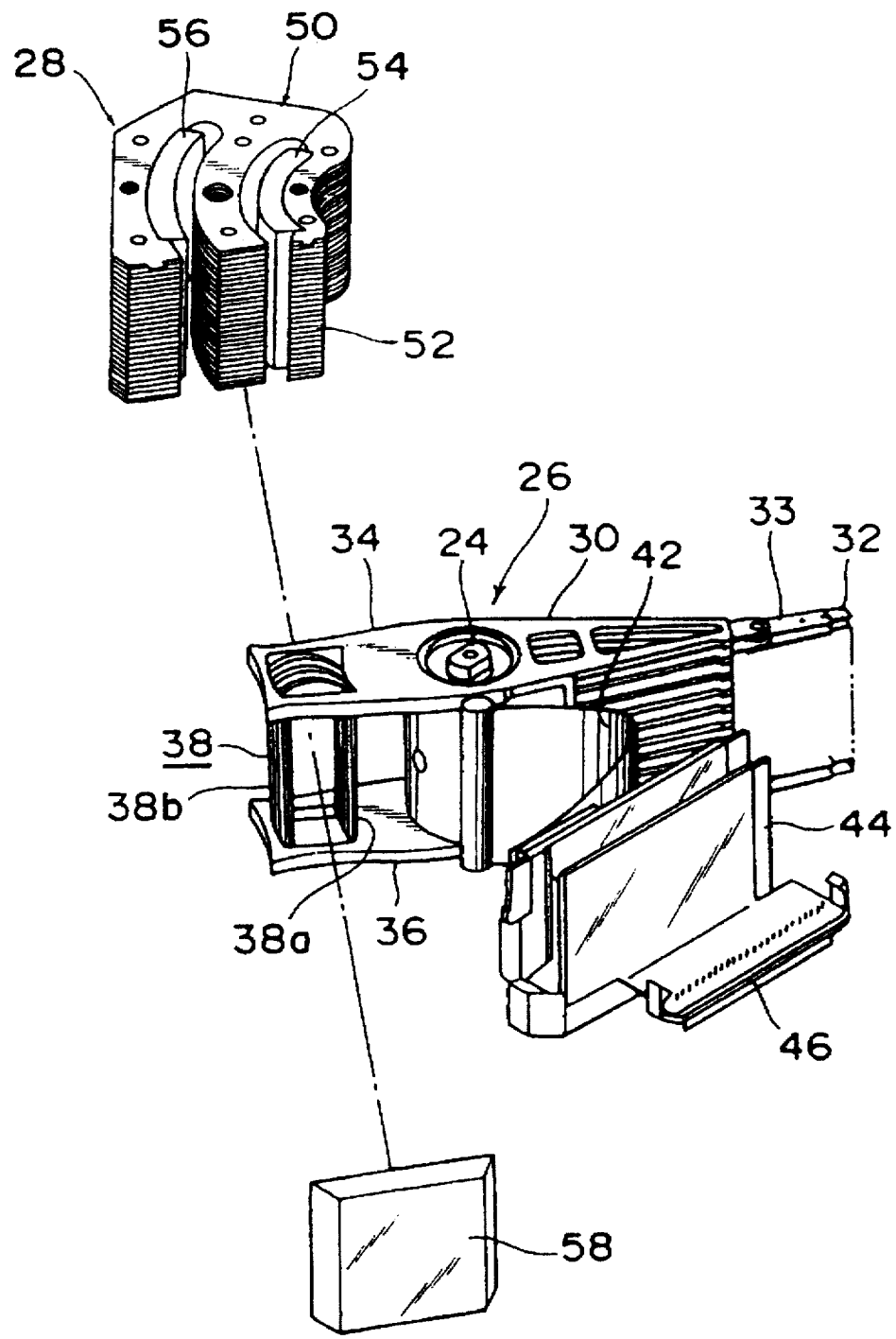
FIG. 2 is an exploded perspective view of a rotary actuator.

Reference numeral 22 denotes a rotary actuator composed of an actuator arm assembly 26 and a magnetic circuit 28. As best shown in FIG. 2, the actuator arm assembly 26 is rotatably mounted on a shaft 24 fixed to the base 14. The actuator arm assembly 26 includes a plurality of actuator arms 30 extending in one direction from the center of rotation and a pair of coil supporting members 34 and 36 extending from the center of rotation in a direction opposite to the direction of extension of the actuator arms 30.

A plurality of spring arms 33 are fixed at their base ends to the front ends of the actuator arms 30, and a plurality of magnetic heads 32 are supported on the front ends of the spring arms 33. A coil 38 is supported by the pair of coil supporting members 34 and 36. The magnetic circuit 28 and the coil 38 inserted in gaps of the magnetic circuit 28 constitute a voice coil motor (VCM) 40. The coil 38 has two effective portions 38a and 38b parallel to the axis of rotation of the actuator arm assembly 26. Reference numeral 42 denotes a flexible printed circuit sheet for taking out signals from the magnetic heads 32. The flexible printed circuit sheet 42 is fixed at one end thereof to a fixing member 44, and is electrically connected to a connector 46.

Referring again to FIG. 1, an annular packing assembly 48 is mounted on the base 14, and the cover 16 is secured by screws to the base 14 with the packing assembly 48 interposed therebetween, thereby sealing the housing 12. Referring to FIG. 2, the magnetic circuit 28 includes a main yoke 50 formed by stacking a plurality of cold-rolled steel plates 52 and then caulking them together. An inner magnet 54 and an outer magnet 56 are attached by their own magnetic forces to the main yoke 50. Reference numeral 58 denotes a side yoke attached to the main yoke 50 by the magnetic forces of the inner magnet 54 and the outer magnet 56.

Figure 3:
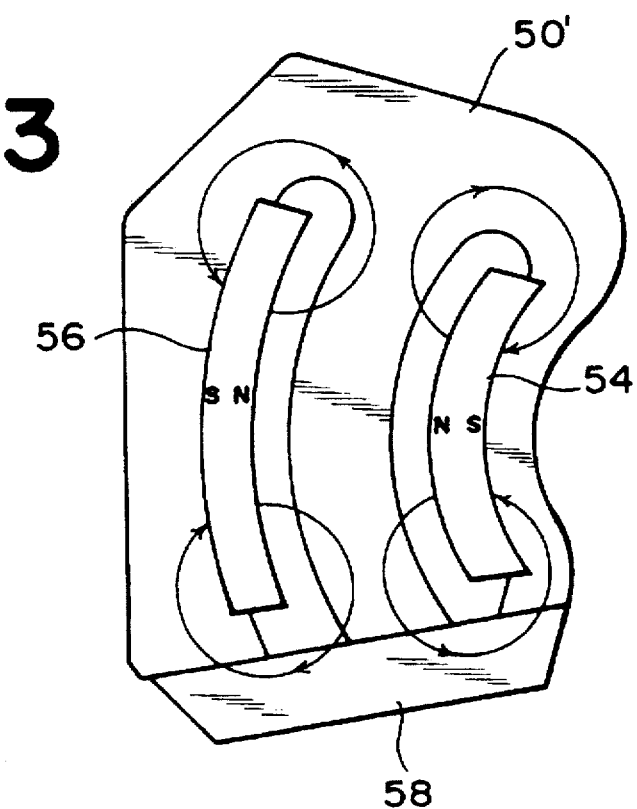
FIG. 3 is a plan view illustrating the lines of magnetic forces formed by magnets.

The technical background in which the magnetic circuit structure of the present invention has been conceived will now be described with reference to FIGS. 3 to 5. As shown in FIG. 3, in a magnetic circuit having an E-shaped main yoke 50', the lines of magnetic forces formed by the inner magnet 54 and the outer magnet 56 concentrate in the peripheries of the ends of the inner and outer magnets 54 and 56.

Figure 4:
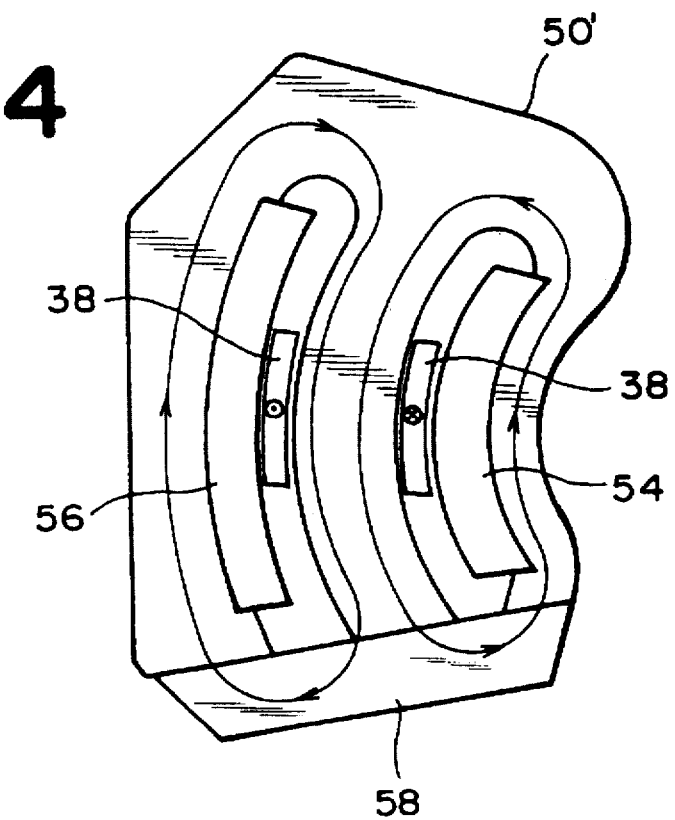
FIG. 4 is a plan view illustrating the lines of magnetic forces formed by energization of a VCM coil.

In contrast therewith, the lines of magnetic forces formed by passing an electric current through the coil (VCM coil 38) of a voice coil motor are shown by the arrows in FIG. 4. As apparent from FIG. 4, the lines of magnetic forces obtained by energizing the VCM coil 38 pass in the completely closed yokes 50' and 58. In this case, the inductance of the VCM coil 38 is proportional to the permeability of a medium (the yokes in this case), so that the inductance of the VCM coil 38 inserted in the magnetic circuit becomes much larger than that in the case where the medium is air.

There will be described a method of reducing the inductance without reducing a magnetic flux density (B) between inner and outer gaps with reference to FIG. 5. In FIG. 5, the three portions shown by hatching represent portions where the lines of magnetic forces obtained by the magnets 54 and 56 do not pass, or portions where the magnetic flux density is small. These portions have almost no influence upon a reduction in magnetic flux density between inner and outer gaps 57 and 59, even without the presence of a highpermeable member. Even if the magnetic flux density is reduced, the reduction in the magnetic flux density is small at a portion near a central cylinder in the seek range of an actuator, where the magnetic flux density is originally relatively large.

Figure 5:
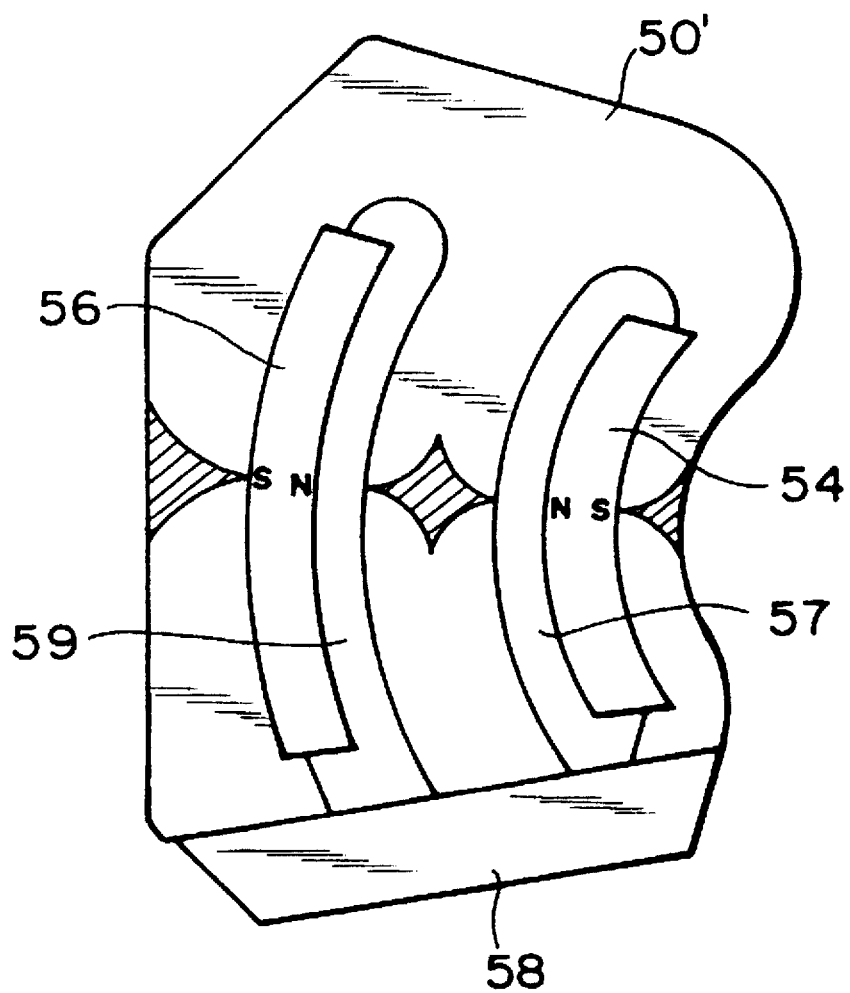
FIG. 5 is a plan view illustrating portions of a magnetic circuit where the lines of magnetic forces formed by the magnets are sparse.

On the other hand, the lines of magnetic force obtained by energizing the VCM coil 38 pass the hatched portions shown in FIG. 5. Therefore, the permeability of the medium on the lines of magnetic force can be partially reduced by eliminating the hatched portions of the main yoke 50' (as by forming holes), thereby reducing the inductance. That is, the inductance of the VCM coil 38 can be reduced without reducing the magnetic flux density between the inner and outer gaps 57 and 59. In particular, the hatched portions of the main yoke 50' are portions where the lines of magnetic force obtained by energizing the VCM coil 38 concentrate, and the elimination of these portions only allows a small reduction in the inductance of the VCM coil 38.

Figure 6:
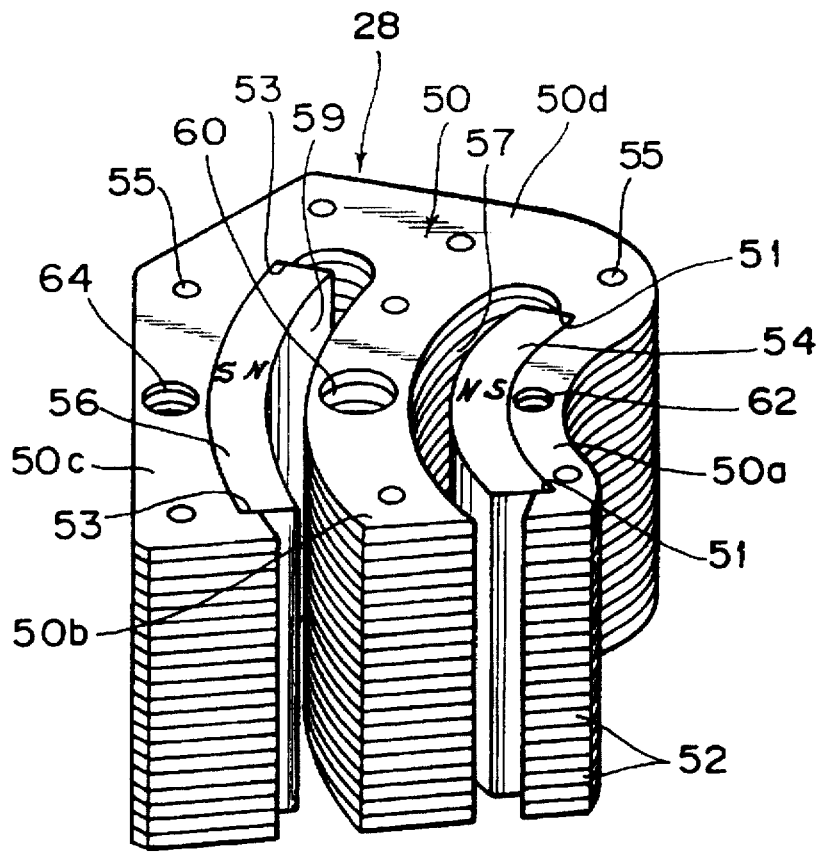
FIG. 6 is an exploded perspective view of a first preferred embodiment of the present invention.
Figure 6:
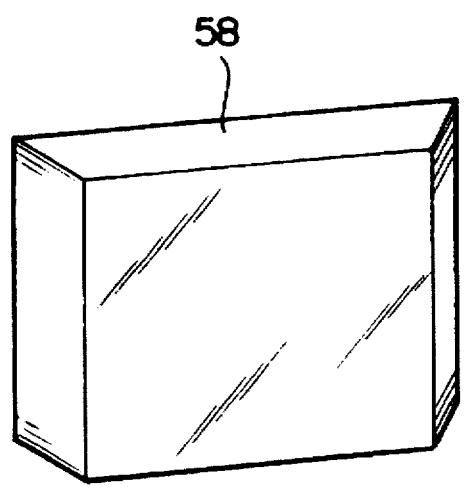

The magnetic circuit 28 according to a first preferred embodiment of the present invention will now be described with reference to FIG. 6. The E-shaped main yoke 50 is manufactured by stacking a plurality of cold-rolled steel plates 52 and caulking them together. That is, a plurality of projections are formed on the upper surface of each steel plate 52, and a plurality of recesses each having a shape corresponding to the shape of each projection are formed on the lower surface of each steel plate 52. Each steel plate 52 is manufactured by pressing.

The main yoke 50 is manufactured by stacking the steel plates 52 in such a manner as to engage the projections formed on the upper surface of each lower steel plate 52 with the recesses formed on the lower surface of each upper steel plate 52 adjacent to the lower steel plate 52, and then caulking the steel plates 52 at the projections and the recesses engaged together. Reference numerals 55 denote caulked portions. The main yoke 50 has an E-shape as viewed in plan so that it is generally composed of an annular or curved inner yoke 50a, an annular center yoke 50b, an annular outer yoke 50c, and a connecting portion 50d integrally connecting the inner yoke 50a, the center yoke 50b, and the outer yoke 50c.

A pair of shoulders 51 against which both ends of the inner magnet 54 abut are formed on the outer circumferential surface of the inner yoke 50a, thereby preventing circumferential slide of the inner magnet 54. Similarly, a pair of shoulders 53 against which both ends of the outer magnet 56 abut are formed on the inner circumferential surface of the outer yoke 50c, thereby preventing circumferential slide of the outer magnet 56.

An inner gap 57 is defined between the inner magnet 54 and the center yoke 50b, and an outer gap 59 is defined between the outer magnet 56 and the center yoke 50b. The two effective portions 38a and 38b of the coil 38 are inserted in these gaps 57 and 59, respectively, to constitute the voice coil motor 40. A through hole 60 is formed at the circumferential central portion of the center yoke 50b. The through hole 60 extends in parallel to the axis of rotation of the actuator arm assembly 26.

Similarly, through holes 62 and 64 extending in parallel to the axis of rotation of the actuator arm assembly 26 are formed at the circumferential central portions of the inner yoke 50a and the outer yoke 50c, respectively. These through holes 60, 62, and 64 of each steel plate 52 are simultaneously formed in manufacturing each steel plate 52 by pressing.

According to this preferred embodiment, the through holes 62, 60, and 64 are formed at the circumferential central portions of the inner yoke 50a, the center yoke 50b, and the outer yoke 50c, respectively. Accordingly, the permeability of the medium on the lines of magnetic force obtained by energizing the VCM coil 38 can be partially reduced to thereby reduce the inductance.

That is, the inductance of the VCM coil 38 can be reduced with hardly reducing the magnetic flux density between the inner and outer gaps 57 and 59. As a result, the rise of an electric current passing through the VCM coil 38 can be made quick as shown in FIG. 7B, thereby improving the acceleration performance of the rotary actuator. For comparison with this characteristic, FIG. 7A shows a rising characteristic of an electric current passing through the VCM coil in the case of using a conventional magnetic circuit having no through holes in the main yoke.

Referring to FIGS. 8 and 9, there are shown an exploded perspective view and a perspective view of a second preferred embodiment of the present invention, respectively. A main yoke 50A in this preferred embodiment is manufactured by sintering. Substantially the same parts as those in the first preferred embodiment will be denoted by the same reference numerals, and the description thereof will be omitted to avoid the repetition.

Also in the main yoke 50A in this preferred embodiment, through holes 62, 60, and 64 extending in parallel to the axis of rotation of the actuator arm assembly 26 are formed at the circumferential central portions of an inner yoke 50a, a center yoke 50b, and an outer yoke 50c, respectively. Accordingly, the inductance of the VCM coil 38 can be reduced with hardly reducing the magnetic flux density between the inner and outer gaps.

Referring to FIGS. 10 and 11, there are shown an exploded perspective view and a perspective view of a third preferred embodiment of the present invention, respectively. A main yoke 50B in this preferred embodiment has a through hole 60' having a rhombic cross section at the circumferential central portion of a center yoke 50b. The through hole 60' extends in parallel to the axis of rotation of the actuator arm assembly 26. One of the two diagonals of the rhombus formed by the through hole 60' extends in the circumferential direction of the center yoke 50b, and the other diagonal extends in a direction perpendicular to the circumferential direction of the center yoke 50b.

Owing to such a rhombic cross section of the through hole 60', the cross sectional shape of the through hole 60' can be made substantially coincident with the shape of the hatched portion of the center yoke shown in FIG. 5 where the lines of magnetic force are sparse, thereby suppressing more of a reduction in magnetic flux density between the inner and outer gaps as compared with the case where the through hole is circular in cross section. Also according to this preferred embodiment, the inductance of the VCM coil 38 can therefore be reduced with hardly reducing the magnetic flux density between the inner and outer gaps.

Referring to FIGS. 12 and 13, there are shown an exploded perspective view and a perspective view of a fourth preferred embodiment of the present invention, respectively. A main yoke 50C in this preferred embodiment is manufactured by stacking a plurality of cold-rolled steel plates 52 and then caulking them together as similar to the first preferred embodiment.

A pair of notches 66 extending in parallel to the axis of rotation of the actuator arm assembly 26 are formed on the inner and outer circumferential surfaces of a center yoke 50b at its circumferential central portion. Similarly, notches 68 and 70 are formed at the circumferential central portions of an inner yoke 50a and an outer yoke 50c, respectively. The notches 66, 68, and 70 of each steel plate 52 can be formed simultaneously in manufacturing each steel plate 52 by pressing. Accordingly, this preferred embodiment can exhibit an effect similar to that of the first preferred embodiment.

Referring to FIGS. 14 and 15, there are shown an exploded perspective view and a perspective view of a fifth preferred embodiment of the present invention, respectively. A main yoke 50D in this preferred embodiment is manufactured by sintering. As similar to the fourth preferred embodiment, notches are formed at the circumferential central portions of an inner yoke 50a, a center yoke 50b, and an outer yoke 50c. However, the difference is that these notches are filled with nonmagnetic members 72, so as to reinforce the notches. Preferably, each nonmagnetic member 72 is formed by insert molding of resin.

Referring to FIGS. 16 and 17, there are shown an exploded perspective view and a perspective view of a sixth preferred embodiment of the present invention, respectively. A main yoke 50E in this preferred embodiment has a first center yoke segment 74 short in length in its circumferential direction. On the other hand, a side yoke 78 is integrally formed with a second center yoke segment 76. Further, a pair of positioning guides 75 for positioning the side yoke 78 are formed at the open end of the E-shaped main yoke 50E.

As shown in FIG. 17, a gap 80 with a given width is defined between the first center yoke segment 74 and the second center yoke segment 76 by bonding the side yoke 78 to the main yoke 50E with the side yoke 78 guided by the positioning guides 75. This gap 80 extends in parallel to the axis of rotation of the actuator arm assembly 26 at the substantially circumferential central portion of a center yoke.

In this preferred embodiment, a repulsive force is generated at a separated portion of the center yoke, that is, between the first center yoke segment 74 and the second center yoke segment 76. Therefore, it is necessary to form the positioning guides 75 for positioning the side yoke 78 to the main yoke 50E. Since the gap 80 is defined at the circumferential central portion of the center yoke, the inductance of the VCM coil 38 can be reduced with hardly reducing the magnetic flux density between the inner and outer gaps.

Referring to FIG. 18, there is shown an exploded perspective view of a seventh preferred embodiment of the present invention. A main yoke 50F in this preferred embodiment has a first center yoke segment 74 short in length in its circumferential direction. Reference numeral 82 denotes a second center yoke segment formed independently of a side yoke 58. The first center yoke segment 74 and the second center yoke segment 82 are aligned in their circumferential directions so that a gap with a given width is defined therebetween. In this condition, an upper rolled steel plate 84 and a lower rolled steel plate 86 are fixed by caulking to the upper surfaces of the main yoke 50F and the second center yoke segment 82 and the lower surfaces of the main yoke 50F and the second center yoke segment 82, respectively. In this condition, an inner magnet 54 and an outer magnet 56 are mounted on the main yoke 50F at its predetermined positions, and the side yoke 58 is attached to the main yoke 50F by the magnetic forces of the inner and outer magnets 54 and 56. Thus, a magnetic circuit of this preferred embodiment is completed.

In the main yoke 50F according to this preferred embodiment, the center yoke is separated into the two segments 74 and 82 at its circumferential central portion to thereby define the gap with the given width between the first center yoke segment 74 and the second center yoke segment 82. Accordingly, the inductance of the VCM coil 38 can be reduced with hardly reducing the magnetic flux density between the inner and outer gaps.

Referring to FIG. 19, there is shown an exploded perspective view of an eighth preferred embodiment of the present invention. In this preferred embodiment, a main yoke 50G is formed by stacking a plurality of rolled steel plates 52, and a second center yoke segment 82 is also formed by stacking a plurality of rolled steel plates 52'. As similar to the seventh preferred embodiment, the main yoke 50G and the second center yoke segment 82 are integrated by an upper rolled steel plate 84 and a lower rolled steel plate 86 with a gap having a given width being defined between a first center yoke segment 74 of the main yoke 50G and the second center yoke segment 82. Thus, this preferred embodiment is similar in structure to the seventh preferred embodiment, and can therefore exhibit a substantially similar effect.

Referring to FIGS. 20 and 21, there are shown an exploded perspective view and a perspective view of a ninth preferred embodiment of the present invention, respectively. As similar to the sixth to eighth preferred embodiments, a main yoke 50H in this preferred embodiment has a first center yoke segment 74 short in length in its circumferential direction. The difference is that a nonmagnetic member 88 is bonded to the end surface of the first center yoke segment 74, and a second center yoke segment 82 is bonded to the nonmagnetic member 88. As shown in FIG. 21, the nonmagnetic member 88 is provided at the circumferential central portion of the center yoke. Accordingly, the inductance of the VCM coil 38 can be reduced with hardly reducing the magnetic flux density between the inner and outer gaps.

Referring to FIGS. 22 and 23, there are shown an exploded perspective view and a perspective view of a tenth preferred embodiment of the present invention, respectively. As similar to the sixth to ninth preferred embodiments, a main yoke 50I in this preferred embodiment has a first center yoke segment 74 short in length in its circumferential direction. The difference is that a projection 90 is formed on the end surface of the first center yoke segment 74, and a similar projection is formed on the end surface of a second center yoke segment 82 opposed to the end surface of the first center yoke segment 74.

The first center yoke segment 74 and the second center yoke segment 82 are aligned in their circumferential directions in such a manner that the projection 90 of the segment 74 abuts against the projection of the segment 82 to define a gap having a given width between the segments 74 and 82. This gap is filled with resin by insert molding to thereby connect the first center yoke segment 74 and the second center yoke segment 82. As shown in FIG. 23, a resin molding 92 filling this gap is provided at the circumferential central portion of the center yoke. Accordingly, the inductance of the VCM coil 38 can be reduced with hardly reducing the magnetic flux density between the inner and outer gaps.

Referring to FIG. 24, there is shown an exploded perspective view of another embodiment of the rotary actuator. As similar to the embodiment shown in FIG. 2, an actuator arm assembly 26' shown in FIG. 24 is rotatably mounted on a shaft 24 fixed to a base 14. The actuator arm assembly 26' includes a plurality of actuator arms 30 extending in one direction from the center of rotation and a pair of coil supporting members 34 and 36 extending from the center of rotation in a direction opposite to the direction of extension of the actuator arms 30.

A coil 38' is supported by the pair of coil supporting members 34 and 36. Two effective portions 38'a and 38'b of the coil 38' extend perpendicularly to the axis of rotation of the actuator arm assembly 26'. A voice coil motor is constituted of a magnetic circuit 94 and the coil 38' inserted in gaps of the magnetic circuit 94. As shown in FIG. 25 which shows an eleventh preferred embodiment of the present invention, a main yoke 96 of the magnetic circuit 94 is formed by connecting an upper yoke 98, a center yoke 100, and a lower yoke 102 at their ends on the same side, thus forming an E-shape as viewed in front elevation.

An upper magnet 104 is mounted on the lower surface of the upper yoke 98 opposed to the center yoke 100, and a lower magnet 106 is mounted on the upper surface of the lower yoke 102 opposed to the center yoke 100. A through hole 114 is formed through the thickness of the center yoke 100 at its circumferential central portion (at the central position in the seek direction of the actuator). A side yoke 108 is attached to the open end of the main yoke 96 by the magnetic forces of the upper and lower magnets 104 and 106, thus completing the magnetic circuit 94.

In this preferred embodiment, the through hole 114 is formed at the circumferential central portion of the center yoke 100. Accordingly, the inductance of the VCM coil 38' can be reduced with hardly reducing the magnetic flux density between an upper gap 110 and a lower gap 112.

Referring to FIG. 26, there is shown a front elevation of a twelfth preferred embodiment of the present invention. A magnetic circuit 94' in this preferred embodiment includes a first main yoke 116 and a second main yoke 122 identical in shape with each other. The first main yoke 116 has an upper yoke 118 and a first center yoke segment 120 formed integrally with the upper yoke 118. The second main yoke 122 has a lower yoke 124 and a second center yoke segment 126 formed integrally with the lower yoke 124.

A gap 128 with a given width is defined between the first center yoke segment 120 and the second center yoke segment 126. An upper magnet 104 is mounted on the lower surface of the upper yoke 118, and a lower magnet 106 is mounted on the upper surface of the lower yoke 124, thus completing the magnetic circuit 94'.

In the magnetic circuit 94' according to this preferred embodiment, the gap 128 with the given width is formed at the circumferential central portion of the center yoke. Accordingly, the inductance of the VCM coil 38' can be reduced with hardly reducing the magnetic flux density between an upper gap 110 and a lower gap 112. Furthermore, since the first main yoke 116 and the second main yoke 122 have the same shape in this preferred embodiment, a manufacturing cost can be reduced.

According to the magnetic circuit structure of the present invention as described above, the inductance of the VCM coil can be reduced with hardly reducing the magnetic flux density between the gaps. As a result, the rising characteristic of an electric current passing through the VCM coil can be improved to thereby improve the acceleration performance of the rotary actuator.

What is claimed is:

1. A magnetic circuit structure in a rotary actuator having an axis of rotation, comprising:
    a main yoke manufactured by stacking a plurality of rolled steel plates, said main yoke including a plurality of yoke pieces including a curved inner yoke, a curved center yoke spaced a given distance from said inner yoke, a curved outer yoke spaced a given distance from said center yoke, and a connecting portion integrally connecting said inner yoke, said center yoke, and said outer yoke, each of said steel plates having holes each at said center yoke and at least one of said inner yoke and said outer yoke of said plurality of yokes;
    an inner magnet mounted on an outer circumferential surface of said inner yoke opposed to said center yoke;
    an outer magnet mounted on an inner circumferential surface of said outer yoke opposed to said center yoke; and
    a side yoke attached to said main yoke on its one side opposite to said connecting portion by magnetic forces of said inner magnet and said outer magnet;
    wherein said center yoke and at least one other yoke of said plurality of yoke pieces have through holes at a substantially central portion in a circumferential direction of said center yoke, said through holes being made by aligning said holes of each of said steel plates when said steel plates are stacked up.

2. A magnetic circuit structure according to claim 1, wherein said through hole of said center yoke extends substantially in parallel to said axis of rotation of said rotary actuator.

3. A magnetic circuit structure according to claim 2, wherein said through hole of said additional yoke piece of said plurality of yoke pieces has a through hole extending substantially parallel to said axis of rotation of said rotary actuator.

4. A magnetic circuit structure in a rotary actuator having an axis of rotation, comprising:
    a main yoke including a curved inner yoke, a curved center yoke spaced a given distance from said inner yoke, a curved outer yoke spaced a given distance from said center yoke, and a connecting portion integrally connecting said inner yoke, said center yoke, and said outer yoke;
    an inner magnet mounted on an outer circumferential surface of said inner yoke opposed to said center yoke;
    an outer magnet mounted on an inner circumferential surface of said outer yoke opposed to said center yoke;
    a side yoke attached to said main yoke on its one side opposite to said connecting portion by magnetic forces of said inner magnet and said outer magnet; and
    said inner yoke, said center yoke, and said outer yoke having through holes at substantially central portions in circumferential directions of said inner, center, and outer yokes.

5. A magnetic circuit structure according to claim 4, wherein said through holes of said inner, center, and outer yokes extend substantially in parallel to said axis of rotation of said rotary actuator.

6. A magnetic circuit structure in a rotary actuator having an axis of rotation, comprising:
    a main yoke including a curved inner yoke, a curved center yoke spaced a given distance from said inner yoke, a curved outer yoke spaced a given distance from said center yoke, and a connecting portion integrally connecting said inner yoke, said center yoke, and said outer yoke;
    an inner magnet mounted on an outer circumferential surface of said inner yoke opposed to said center yoke;
    an outer magnet mounted on an inner circumferential surface of said outer yoke opposed to said center yoke;
    a side yoke attached to said main yoke on its one side opposite to said connecting portion by magnetic forces of said inner magnet and said outer magnet; and
    said center yoke having a through hole having a rectangular cross section at a substantially central portion in a circumferential direction of said center yoke, said rectangular cross section of said through hole having a diagonal extending in the circumferential direction of said center yoke.

7. A magnetic circuit structure according to claim 6, wherein said through hole extends substantially in parallel to said axis of rotation of said rotary actuator.

8. A magnetic circuit structure in a rotary actuator having an axis of rotation, comprising:

a main yoke formed of a plurality of steel plates, said main yoke including a curved inner yoke, a curved center yoke spaced a given distance from said inner yoke, a curved outer yoke spaced a given distance from said center yoke, and a connecting portion integrally connecting said inner yoke, said center yoke, and said outer yoke;

an inner magnet mounted on an outer circumferential surface of said inner yoke opposed to said center yoke;

an outer magnet mounted on an inner circumferential surface of said outer yoke opposed to said center yoke;

a side yoke attached to said main yoke on its one side opposite to said connecting portion by magnetic forces of said inner magnet and said outer magnet;

said center yoke having a notch on at least one of an inner circumferential surface and an outer circumferential surface of said center yoke at a substantially central portion in a circumferential direction of said center yoke;

said inner yoke having a notch on an inner circumferential surface at a substantially central portion in a circumferential direction of said inner yoke; and said outer yoke having a notch on an outer circumferential surface at a substantially central portion in a circumferential direction of said outer yoke.

9. A magnetic circuit structure according to claim 8, wherein each said notch extends substantially in parallel to said axis of rotation of said rotary actuator.

10. A magnetic circuit structure in a rotary actuator having an axis of rotation, comprising:

a main yoke including a curved inner yoke, a curved center yoke spaced a given distance from said inner yoke, a curved outer yoke spaced a given distance from said center yoke, and a connecting portion integrally connecting said inner yoke, said center yoke, and said outer yoke;

an inner magnet mounted on an outer circumferential surface of said inner yoke opposed to said center yoke;

an outer magnet mounted on an inner circumferential surface of said outer yoke opposed to said center yoke;

a side yoke attached to said main yoke on its one side opposite to said connecting portion by magnetic forces of said inner magnet and said outer magnet;

said center yoke having a notch on at least one of an inner circumferential surface and an outer circumferential surface of said center yoke at a substantially central portion in a circumferential direction of said center yoke, said notch extending substantially in parallel to said axis of rotation of said rotary actuator;

said inner yoke and said outer yoke having notches extending substantially in parallel to said axis of rotation of said rotary actuator on an inner circumferential surface of said inner yoke and an outer circumferential surface of said outer yoke at substantially central portions in circumferential directions of said inner and outer yokes; and each of said notches being filled with a nonmagnetic member.

11. A magnetic circuit structure according to claim 10, wherein said nonmagnetic member filling each of said notches is formed by insert molding of resin.

12. A magnetic circuit structure in a rotary actuator having an axis of rotation, comprising:

a main yoke including a curved inner yoke, a curved first center yoke segment spaced a given distance from said inner yoke, a curved outer yoke spaced a given distance from said first center yoke segment, and a connecting portion integrally connecting said inner yoke, said first center yoke segment, and said outer yoke;

an inner magnet mounted on an outer circumferential surface of said inner yoke opposed to said first center yoke segment;

an outer magnet mounted on an inner circumferential surface of said outer yoke opposed to said first center yoke segment; and a side yoke attached to said main yoke on its one side opposite to said connecting portion by magnetic forces of said inner magnet and said outer magnet, said side yoke having a curved second center yoke segment formed integrally therewith;

wherein said main yoke has a positioning guide opposite to said connecting portion, for positioning said side yoke and a gap with a given width is defined between said first center yoke segment and said second center yoke segment.

13. A magnetic circuit structure in a rotary actuator having an axis of rotation, comprising:

a main yoke including a curved inner yoke, a curved first center yoke segment spaced a given distance from said inner yoke, a curved outer yoke spaced a given distance from said first center yoke segment, and a connecting portion integrally connecting said inner yoke, said first center yoke segment, and said outer yoke;

a curved second center yoke segment;

an upper magnetic plate fixed by caulking to an upper surface of said main yoke and an upper surface of said second center yoke segment so that said first center yoke segment and said second center yoke segment are aligned in their circumferential directions with a gap having a given width being defined therebetween;

a lower magnetic plate fixed by caulking to a lower surface of said main yoke and a lower surface of said second center yoke segment;

an inner magnet mounted on an outer circumferential surface of said inner yoke opposed to said first and second center yoke segments;

an outer magnet mounted on an inner circumferential surface of said outer yoke opposed to said first and second center yoke segments; and a side yoke attached to said main yoke and said second center yoke segment on their one side opposite to said connecting portion by magnetic forces of said inner magnet and said outer magnet.

14. A magnetic circuit structure according to claim 13, wherein each of said main yoke and said second center yoke segment is formed by stacking a plurality of rolled steel plates.

15. A magnetic circuit structure in a rotary actuator having a vertical axis of rotation, comprising:

a main yoke including a curved inner yoke, a curved first center yoke segment spaced a given distance from said inner yoke, a curved outer yoke spaced a given distance from said first center yoke segment, and a connecting portion integrally formed with and connecting said inner yoke, said first center yoke segment, and said outer yoke;

a curved second center yoke segment;

a nonmagnetic connecting member interposed between and bonded to each of said first center yoke segment and said second center yoke segment, for connecting said first and second center yoke segments, said nonmagnetic connecting member further generally extending parallel to said vertical axis of rotation;

an inner magnet mounted on an outer circumferential surface of said inner yoke opposed to said first and second center yoke segments;

an outer magnet mounted on an inner circumferential surface of said outer yoke opposed to said first and second center yoke segments; and a side yoke attached to said main yoke and said second center yoke segment on their one side opposite to said connecting portion by magnetic forces of said inner magnet and said outer magnet.

16. A magnetic circuit structure in a rotary actuator having an axis of rotation, comprising:

a main yoke including a curved inner yoke, a curved first center yoke segment spaced a given distance from said inner yoke, a curved outer yoke spaced a given distance from said first center yoke segment, and a connecting portion integrally connecting said inner yoke, said first center yoke segment, and said outer yoke, said first center yoke segment having a first projection formed integrally on an end surface thereof;

a curved second center yoke segment, said second center yoke segment having a second projection formed integrally on an end surface thereof, the end surface of said second center yoke segment opposing the end surface of said first center yoke segment;

said first center yoke segment and said second center yoke segment being connected together by insert molding with the first and second projections contacting each other to define a gap between the end surface of said first and second center yoke segments, said gap being filled with resin;

an inner magnet mounted on an outer circumferential surface of said inner yoke opposed to said first and second center yoke segments;

an outer magnet mounted on an inner circumferential surface of said outer yoke opposed to said first and second center yoke segments; and a side yoke attached to said main yoke and said second center yoke segment on their one side opposite to said connecting portion by magnetic forces of said inner magnet said outer magnet.

* * * * *